United States Patent
Nakao et al.

(10) Patent No.: US 12,057,710 B2
(45) Date of Patent: Aug. 6, 2024

(54) SYSTEM AND METHODS OF A NON-CONTACT FEEDING DEVICE PROVIDING CONSTANT OUTPUT VOLTAGE TO A POWER RECEIVING DEVICE

(71) Applicant: Omron Corporation, Kyoto (JP)

(72) Inventors: Goro Nakao, Kyoto (JP); Yusuke Kawai, Kyoto (JP); Atsushi Nomura, Kyoto (JP); Toshiyuki Zaitsu, Kyoto (JP)

(73) Assignee: Omron Corporation, Kyoto (JP)

( * ) Notice: Subject to any disclaimer, the term of this patent is extended or adjusted under 35 U.S.C. 154(b) by 518 days.

(21) Appl. No.: 16/282,360

(22) Filed: Feb. 22, 2019

(65) Prior Publication Data

US 2019/0312525 A1    Oct. 10, 2019

(30) Foreign Application Priority Data

Mar. 27, 2018    (JP) ................................ 2018-060309

(51) Int. Cl.
*H02J 50/12* (2016.01)
*H01F 38/14* (2006.01)
(Continued)

(52) U.S. Cl.
CPC .............. *H02J 50/12* (2016.02); *H01F 38/14* (2013.01); *H02J 7/00712* (2020.01);
(Continued)

(58) Field of Classification Search
CPC ................... H02J 50/00; H04B 5/00
(Continued)

(56) References Cited

U.S. PATENT DOCUMENTS

| 4,742,441 A | * | 5/1988 | Akerson | ............... H02M 7/538 363/127 |
|---|---|---|---|---|
| 4,864,213 A | * | 9/1989 | Kido | ...................... H02M 1/36 323/222 |

(Continued)

FOREIGN PATENT DOCUMENTS

| EP | 2066013 A2 | 6/2009 |
|---|---|---|
| JP | 2012-90476 A | 5/2012 |
| JP | 2017-034950 A | 2/2017 |

OTHER PUBLICATIONS

Extended European Search Report issued in counterpart European Patent Application No. 19156446.7, mailed Jun. 7, 2019 (7 Pages).

*Primary Examiner* — Adi Amrany
(74) *Attorney, Agent, or Firm* — Osha Bergman Watanabe & Burton LLP

(57) ABSTRACT

A power transmission device of the non-contact feeding device includes the transmission coil that supplies power to a power receiving device, a power supply circuit that supplies AC power obtained by boosting or stepping down the input voltage to the transmission coil, a voltage detection circuit that measures the voltage input to the power supply circuit, and a control circuit that controls a degree of boosting or step-down with respect to the input voltage by the power supply circuit according to the input voltage measured. The power receiving device includes a resonance circuit including a receiving coil that receives the power from the power transmission device and a resonance capacitor that resonates with the receiving coil according to the power from the power transmission device and a rectifier circuit that rectifies the power output from the resonance circuit.

1 Claim, 10 Drawing Sheets

(51) Int. Cl.
*H02J 7/00* (2006.01)
*H02M 1/42* (2007.01)
*H02M 7/06* (2006.01)
*H02M 7/537* (2006.01)
*H02M 1/00* (2006.01)

(52) U.S. Cl.
CPC ........... H02M 1/4241 (2013.01); H02M 7/06 (2013.01); H02M 7/537 (2013.01); *H02M 1/007* (2021.05)

(58) Field of Classification Search
USPC .......................................................... 307/104
See application file for complete search history.

(56) References Cited

U.S. PATENT DOCUMENTS

| | | | | |
|---|---|---|---|---|
| 6,040,661 | A * | 3/2000 | Bogdan | H05B 41/295 |
| | | | | 315/224 |
| 7,095,215 | B2 * | 8/2006 | Liu | H02M 1/36 |
| | | | | 323/222 |
| 9,561,730 | B2 * | 2/2017 | Widmer | B60L 53/11 |
| 9,973,099 | B2 * | 5/2018 | Ye | H02M 3/33576 |
| 10,919,401 | B2 * | 2/2021 | Elshaer | H02J 50/12 |
| 10,938,242 | B2 * | 3/2021 | Choi | H02J 50/12 |
| 2004/0067050 | A1 * | 4/2004 | Woodward | H02P 25/04 |
| | | | | 388/804 |
| 2005/0269999 | A1 * | 12/2005 | Liu | H02M 1/36 |
| | | | | 323/222 |
| 2006/0213890 | A1 * | 9/2006 | Kooken | H02M 1/4225 |
| | | | | 219/130.21 |
| 2007/0279002 | A1 * | 12/2007 | Partovi | H02J 7/0013 |
| | | | | 320/115 |
| 2010/0289423 | A1 * | 11/2010 | Yao | H02M 3/1582 |
| | | | | 315/246 |
| 2011/0110127 | A1 * | 5/2011 | Lee | G05F 1/70 |
| | | | | 363/44 |
| 2012/0044726 | A1 * | 2/2012 | Voyer | H02M 3/07 |
| | | | | 363/60 |
| 2013/0049674 | A1 * | 2/2013 | Davis | B60L 53/52 |
| | | | | 320/101 |
| 2014/0009109 | A1 * | 1/2014 | Lee | H02J 50/80 |
| | | | | 320/108 |
| 2014/0265615 | A1 * | 9/2014 | Kim | B60L 53/126 |
| | | | | 307/104 |
| 2014/0277810 | A1 * | 9/2014 | Costa | G06F 1/30 |
| | | | | 700/297 |
| 2014/0354074 | A1 | 12/2014 | Sadakata et al. | |
| 2015/0091465 | A1 * | 4/2015 | Kato | H05B 45/37 |
| | | | | 315/205 |
| 2015/0303714 | A1 * | 10/2015 | Keeling | B60L 53/00 |
| | | | | 320/108 |
| 2016/0111888 | A1 * | 4/2016 | Cho | H02J 50/10 |
| | | | | 307/104 |
| 2016/0134131 | A1 | 5/2016 | Murayama | |
| 2016/0176300 | A1 * | 6/2016 | Bucher | B60L 11/182 |
| | | | | 307/104 |
| 2016/0181871 | A1 * | 6/2016 | Krumme | H02M 3/335 |
| | | | | 307/104 |
| 2017/0018932 | A1 * | 1/2017 | Pahlevaninezhad | H02M 7/48 |
| 2017/0018965 | A1 * | 1/2017 | Lee | H02J 50/60 |
| 2017/0066336 | A1 * | 3/2017 | Okamoto | H02J 7/025 |
| 2017/0104370 | A1 * | 4/2017 | Watanabe | H02J 50/60 |
| 2017/0267111 | A1 * | 9/2017 | Ochi | B60L 53/126 |
| 2017/0302157 | A1 * | 10/2017 | Lin | H02M 1/42 |
| 2017/0346414 | A1 * | 11/2017 | Mondal | H05B 41/2824 |
| 2018/0131235 | A1 * | 5/2018 | Inoue | H02J 50/12 |
| 2018/0301934 | A1 * | 10/2018 | Prabhala | H02M 7/53871 |
| 2019/0111911 | A1 * | 4/2019 | Wang | B60W 30/18127 |
| 2020/0014245 | A1 * | 1/2020 | Costinett | H02M 1/4241 |

* cited by examiner

SYSTEM AND METHODS OF A NON-CONTACT FEEDING DEVICE PROVIDING CONSTANT OUTPUT VOLTAGE TO A POWER RECEIVING DEVICE

CROSS-REFERENCE TO RELATED APPLICATION

This application is based on Japanese Patent Application No. 2018-060309 filed with the Japan Patent Office on Mar. 27, 2018, the entire contents of which are incorporated herein by reference.

FIELD

The present invention relates to a non-contact feeding device.

BACKGROUND

Conventionally, what is called a non-contact feeding (also referred to as wireless feeding) technique of transmitting power through a space with no use of a metallic contact or the like has been studied.

In the non-contact feeding device, a coil (hereinafter referred to as a transmission coil) operating as a part of a transformer is provided on a primary side (power transmission side) and a coil (hereinafter referred to as a receiving coil) operating as another part of the transformer is provided on a secondary side (power receiving side). A device on the power transmission side supplies AC power to the transmission coil to transmit the power from the transmission coil to the receiving coil.

In the non-contact power supply, power transmission efficiency is expressed by a product of a degree of coupling k between the transmission coil and the receiving coil and a Q value that is an index of the strength of resonance. The Q value is required to increase in order to improve the power transmission efficiency. In particular, in the case that the power is received through a resonance circuit in which the receiving coil and a capacitor resonate in parallel on the power receiving side, voltage of the transmitted power is also required to increase in order to increase the Q value.

In the case that a load circuit driven by the power supplied through the resonance circuit on the power receiving side does not require a high voltage, it is necessary to provide a DC-DC converter that lowers the voltage of the supplied power between the resonance circuit and the load circuit. When the voltage is lowered by the DC-DC converter, a power loss is generated, which is undesirable depending on application.

On the other hand, for example, Japanese Unexamined Patent Application Publication No. 2017-34950 proposes a technique in which in first control for controlling the transmission power to target power by adjusting a duty of an output voltage of an inverter provided on the power transmission side and second control for controlling the transmission power to the target power by adjusting a boosting ratio of a power factor improvement circuit provided on the power transmission side, the first control is performed in the case that the target power is first power, and the second control is performed in the case that the target power is second power smaller than the first power.

As in the above technique, sometimes the power factor improvement circuit is used to adjust the voltage of the AC power supplied to the transmission coil in the device on the power transmission side. Because the power factor improvement circuit typically has a boosting function, the voltage output from the power factor improvement circuit is higher than the voltage input to the power factor improvement circuit. Sometimes the voltage input to the power factor improvement circuit is not constant, but fluctuates due to various factors. When the voltage input to the power factor improvement circuit becomes excessively high due to the voltage fluctuation, the voltage taken out from the receiving coil on the power receiving side becomes higher than a target value of the voltage supplied to the load circuit even when a degree of boosting of the power factor improvement circuit is adjusted. In particular, in the case that the load circuit is designed to operate at a constant voltage, the supply of the power having the voltage higher than the target value to the load circuit causes a breakdown, which is undesirable.

SUMMARY

An object of the present invention is to provide a non-contact feeding device capable of keeping the output voltage on the power receiving side constant even when the voltage input to a power supply circuit that supplies the AC power to the transmission coil fluctuates.

According to one aspect of the present invention, a non-contact feeding device includes: a power transmission device; and a power receiving device to which power is transmitted from the power transmission device in a non-contact manner. In this non-contact feeding device, the power transmission device includes: a transmission coil configured to supply the power to the power receiving device; a power supply circuit configured to supply AC power obtained by boosting or stepping down input voltage to the transmission coil; a voltage detection circuit configured to measure the input voltage to the power supply circuit; and a control circuit configured to control a degree of boosting or step-down with respect to the input voltage by the power supply circuit according to the input voltage measured. The power receiving device includes: a resonance circuit including a receiving coil receiving the power from the power transmission device and a resonance capacitor resonating with the receiving coil according to the power from the power transmission device; and a rectifier circuit configured to rectify the power output from the resonance circuit.

With this configuration, the non-contact feeding device can keep the output voltage on the power receiving side constant even when the voltage input to the power supply circuit that supplies the AC power to the transmission coil fluctuates.

In this non-contact feeding device, preferably the power supply circuit of the power transmission device includes: a power factor improvement circuit configured to boost the input voltage and output DC power; and an inverter configured to convert the DC power output from the power factor improvement circuit into AC power, the control circuit causes the inverter to perform a full-bridge operation when the input voltage measured is less than a predetermined voltage, and the control circuit causes the inverter to perform a half-bridge operation when the input voltage measured is greater than or equal to the predetermined voltage.

With this arrangement, the non-contact feeding device can properly adjust the degree of boosting or step-down of the voltage of the AC power supplied to the transmission coil with respect to the input voltage with a simple configuration.

Alternatively, in this non-contact feeding device, preferably the power supply circuit includes: a power factor improvement circuit configured to boost the input voltage and output DC power; a voltage converter configured to boost or step down voltage of the DC power output from the power factor improvement circuit; an inverter configured to convert the DC power output from the voltage converter into AC power; and a short circuit configured to switch whether to short-circuit the voltage converter, and the control circuit controls the short circuit so as to switch whether to short-circuit the voltage converter according to the input voltage measured.

Consequently, the non-contact feeding device can properly adjust the degree of boosting or step-down of the voltage of the AC power supplied to the transmission coil with respect to the input voltage.

In this case, preferably the voltage converter steps down the voltage of the DC power output from the power factor improvement circuit, the control circuit controls the short circuit so as to short-circuit the voltage converter when the input voltage measured is less than a predetermined voltage, and the control circuit controls the short circuit so as not to short-circuit the voltage converter when the input voltage measured is greater than or equal to the predetermined voltage.

Consequently, in the non-contact feeding device, even when a target value of the output voltage on the power receiving side is low and even when the input voltage fluctuates, the output voltage on the power receiving side can be maintained at the target value.

DETAILED DESCRIPTION

Hereinafter, a non-contact feeding device according to one embodiment of the present invention will be described with reference to the drawings. The non-contact feeding device switches between a full-bridge operation or a half-bridge operation of an inverter of a power supply circuit according to voltage input to the power supply circuit that supplies AC power to a transmission coil. In particular, the non-contact feeding device decreases a ratio of the voltage output from the power supply circuit to the input voltage by causing the inverter to perform the half-bridge operation in the case that the input voltage is greater than or equal to a predetermined voltage, and the non-contact feeding device increases the ratio of the voltage output from the power supply circuit to the input voltage by causing the inverter to perform the full-bridge operation in the case that the input voltage is less than the predetermined voltage. Consequently, the non-contact feeding device can keep the output voltage on the power receiving side constant, namely, the non-contact feeding device can perform the constant voltage output operation even when the input voltage fluctuates.

Figure 1:
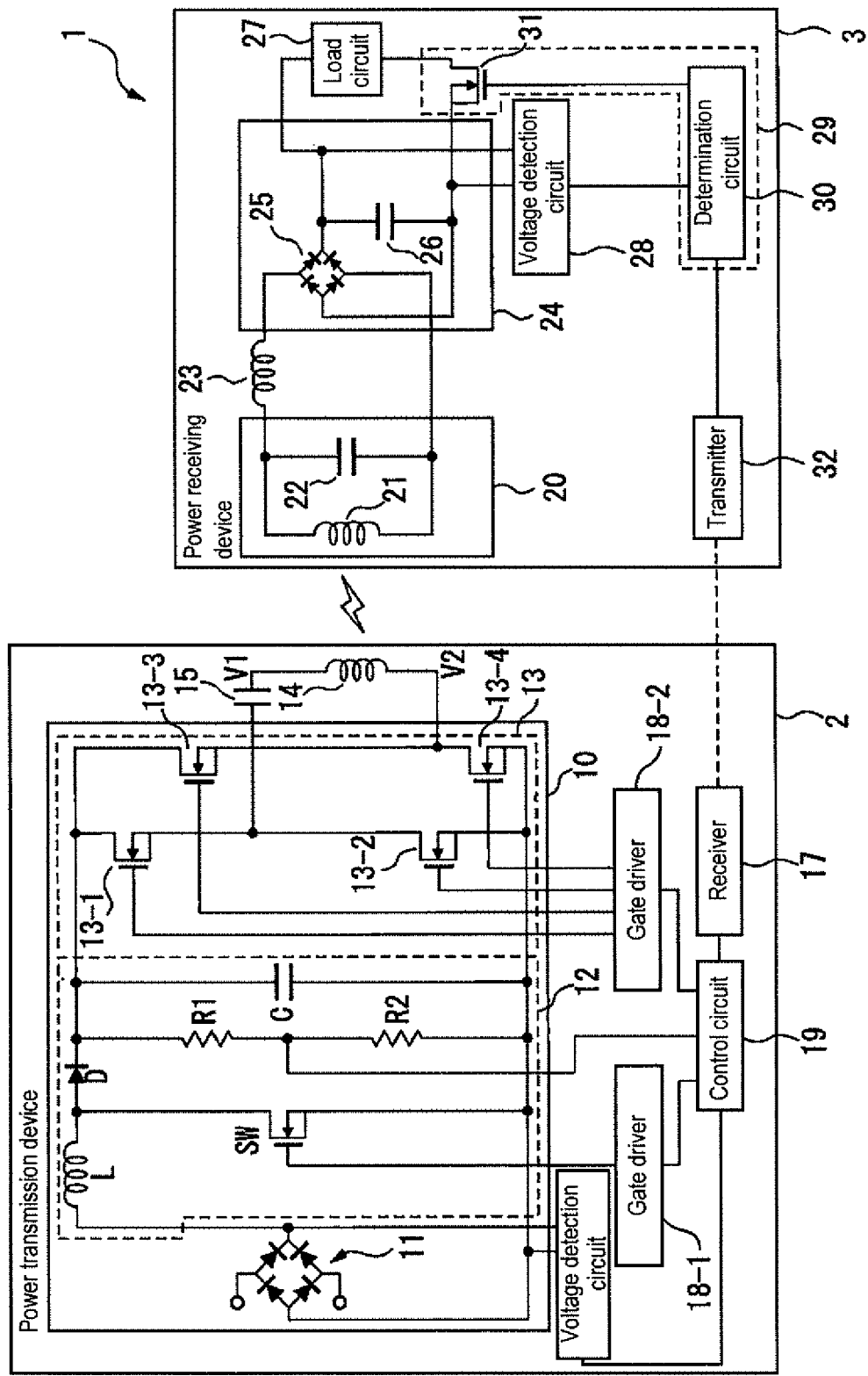
FIG. 1 is a schematic configuration diagram illustrating a non-contact feeding device according to one embodiment of the present invention.

FIG. 1 is a schematic configuration diagram illustrating the non-contact feeding device of the embodiment of the present invention. As illustrated in FIG. 1, a non-contact feeding device 1 includes a power transmission device 2 and a power receiving device 3 that performs power transmission in a non-contact manner through a space from the power transmission device 2. The power transmission device 2 includes a power supply circuit 10, a transmission coil 14, a capacitor 15, a voltage detection circuit 16, a receiver 17, gate drivers 18-1, 18-2, and a control circuit 19. On the other hand, the power receiving device 3 includes a resonance circuit 20 including a receiving coil 21 and a resonance capacitor 22, a coil 23, a rectification smoothing circuit 24, a load circuit 27, a voltage detection circuit 28, a constant voltage determination circuit 29, and a transmitter 32. The non-contact feeding device 1 can perform the constant voltage output operation, because the non-contact feeding device 1 has the same configuration as what is called an SPL system non-contact feeding device. In the SPL system non-contact feeding device, the transmission coil and the capacitor resonate in series on the power transmission side, the receiving coil and the resonance capacitor resonate in parallel on the power receiving side, and a reactor connected in series to the receiving coil is provided. However, the non-contact feeding device 1 does not use resonance on the power transmission side. That is, the non-contact feeding device 1 improves power transmission efficiency by supplying AC power having a frequency at which the transmission coil 14 does not resonate to the transmission coil 14.

The power transmission device 2 will be described.

The power supply circuit 10 supplies the AC power having an adjustable switching frequency and an adjustable voltage to the transmission coil 14, the AC power being obtained by boosting or stepping down the input voltage. For this purpose, the power supply circuit 10 includes a power source 11, a power factor improvement circuit 12, and an inverter 13. The inverter 13 includes four switching elements 13-1 to 13-4.

The power source 11 supplies electric power having a predetermined pulsating voltage. For this purpose, the power source 11 is connected to a commercial AC power source, and includes a full-wave rectifier circuit that rectifies the AC power supplied from the commercial AC power source. That is, the voltage input from the AC power supply to the power source 11 becomes the voltage input to the power supply circuit 10.

The power factor improvement circuit 12 converts the voltage of the power output from the power source 11 into the voltage according to the control from the control circuit 19, and outputs the voltage. For this purpose, for example, the power factor improvement circuit 12 includes a coil L and a diode D that are connected in series in order from a positive-side terminal of the power source 11, a switching element SW that is an n-channel type metal-oxide semiconductor field-effect transistor (MOSFET) in which a drain terminal is connected between the coil L and the diode D and a source terminal is connected to a negative-side terminal of the power source 11, and a smoothing capacitor C that is connected in parallel to the switching element SW with the diode D interposed therebetween. A gate terminal of the switching element SW is connected to the gate driver 18-1. The power factor improvement circuit 12 also includes two resistors R1, R2 connected in series between the positive-side terminal and the negative-side terminal of the power source 11. The resistors R1, R2 are connected in parallel to the smoothing capacitor C between the diode D and the smoothing capacitor C. The voltage between the resistors R1, R2 is measured by the control circuit 19 as the voltage indicating the voltage output from the diode D.

According to a duty ratio instructed by the control circuit 19, the gate driver 18-1 controls turn-on and turn-off of the switching element SW such that a trajectory of a current waveform output from the diode D is matched with a trajectory of the voltage supplied from the power source 11, whereby the power factor improvement circuit 12 performs power factor improving operation. The voltage output from the diode D increases with increasing duty ratio at which the switching element SW is turned on.

The voltage output from the diode D is smoothed by the smoothing capacitor C, and supplied to the transmission coil 14 through the four switching elements 13-1 to 13-4 constituting the inverter 13 and the capacitor 15.

The power factor improvement circuit 12 is not limited to the above configuration, but may have another configuration capable of adjusting the output voltage under the control of the control circuit 19.

For example, an n-channel type MOSFET can be used as the four switching elements 13-1 to 13-4 constituting the inverter 13. Among the four switching elements 13-1 to 13-4, the switching elements 13-1 and 13-2 are connected in series between the positive-side terminal and the negative-side terminal of the power source 11 through the power factor improvement circuit 12. In the embodiment, the switching element 13-1 is connected to the positive side of the power source 11, and the switching element 13-2 is connected to the negative side of the power source 11. The drain terminal of the switching element 13-1 is connected to the positive-side terminal of the power source 11 through the power factor improvement circuit 12, and the source terminal of the switching element 13-1 is connected to the drain terminal of the switching element 13-2. The source terminal of the switching element 13-2 is connected to the negative-side terminal of the power source 11 through the power factor improvement circuit 12. The source terminal of the switching element 13-1 and the drain terminal of the switching element 13-2 are connected to one end of the transmission coil 14, and the source terminal of the switching element 13-2 is connected to the other end of the transmission coil 14 through the switching element 13-4 and the capacitor 15.

Similarly, among the four switching elements 13-1 to 13-4, the switching elements 13-3 and 13-4 are connected in parallel to the switching elements 13-1 and 13-2, and connected in series between the positive-side terminal and the negative-side terminal of the power source 11 through the power factor improvement circuit 12. The switching element 13-3 is connected to the positive side of the power source 11, and the switching element 13-4 is connected to the negative side of the power source 11. The drain terminal of the switching element 13-3 is connected to the positive-side terminal of the power source 11 through the power factor improvement circuit 12, and the source terminal of the switching element 13-3 is connected to the drain terminal of the switching element 13-4. The source terminal of the switching element 13-4 is connected to the negative-side terminal of the power source 11 through the power factor improvement circuit 12. The source terminal of the switching element 13-3 and the drain terminal of the switching element 13-4 are connected to the other end of the transmission coil 14 through the capacitor 15.

The gate terminals of the switching elements 13-1 to 13-4 are connected to the control circuit 19 through the gate driver 18-2. In order to ensure that the switching elements 13-1 to 13-4 are turned on when the turn-on voltage is applied to the gate terminals of the switching elements 13-1 to 13-4, the gate terminal of each of the switching elements 13-1 to 13-4 may be connected to the source terminal of each of the switching elements 13-1 to 13-4 through the resistor. Each of the switching elements 13-1 to 13-4 switches between the turn-on and the turn-off at an adjustable switching frequency according to a control signal from the control circuit 19. In the embodiment, in the case that the inverter 13 performs the full-bridge operation, a pair of the switching elements 13-1 and 13-4 and a pair of the switching elements 13-2 and 13-3 switch alternately between the turn-on and the turn-off such that the switching elements 13-2 and 13-3 are turned off while the switching elements 13-1 and 13-4 are turned on, and such that the switching elements 13-1 and 13-4 are turned off while the switching elements 13-2 and 13-3 are turned on. As a result, DC power supplied from the power source 11 through the power factor improvement circuit 12 is converted into AC power having the switching frequency of each switching element, and supplied to the transmission coil 14.

In the case that the inverter 13 performs the half-bridge operation, one of the switching elements 13-3 and 13-4 is always kept turned on, and the other is always kept turned off. The switching elements 13-1 and 13-2 switch alternately between the turn-on and the turn-off such that the switching element 13-2 is turned off while the switching element 13-1 is turned on, and such that the switching element 13-1 is turned off while the switching element 13-2 is turned on. As a result, DC power supplied from the power source 11 through the power factor improvement circuit 12 is converted into AC power having the switching frequency of each switching element, and supplied to the transmission coil 14. The voltage applied to the transmission coil 14 in the case that the inverter 13 performs the half-bridge operation becomes half the voltage applied to the transmission coil 14 in the case that the inverter 13 performs the full-bridge operation.

The transmission coil 14 transmits the AC power supplied from the power supply circuit 10 to the resonance circuit 20 of the power receiving device 3 through a space.

The capacitor 15 is connected in series to the transmission coil 14. The capacitor 15 suppresses direct current from being passed through the transmission coil 14, and supplies the AC power to the transmission coil 14 together with the inverter 13 when the inverter 13 performs the half-bridge operation.

The voltage detection circuit 16 measures the voltage output from the power source 11, and outputs the measured value to the control circuit 19. Because the voltage output from the power source 11 corresponds to the voltage input from the commercial power source to the power source 11 in a one-to-one manner, the measured value of the voltage by the voltage detection circuit 16 becomes indirectly the measured value of the voltage input to the power source 11. In the embodiment, because the power source 11 includes a full-wave rectifier circuit, the voltage output from the power source 11 becomes a pulsating voltage. Thus, any one of various publicly known voltage detection circuits capable of detecting the pulsating voltage can be used as the voltage detection circuit 16. The voltage detection circuit 16 may be provided so as to directly measure the voltage from the commercial power source that supplies the AC power to the power source 11.

Each time the receiver 17 receives a radio signal from the transmitter 32 of the power receiving device 3, the receiver 17 extracts determination information indicating whether the non-contact feeding device 1 performs the constant voltage output operation from the radio signal, and outputs the determination information to the control circuit 19. For this reason, for example, the receiver 17 includes an antenna that receives the radio signal pursuant to a predetermined radio communication standard and a communication circuit that demodulates the radio signal. Examples of the predetermined radio communication standard include ISO/IEC 15693, ZigBee (registered trademark), and Bluetooth (registered trademark).

The gate driver 18-1 receives the control signal switching between the turn-on and the turn-off of the switching element SW of the power factor improvement circuit 12 from the control circuit 19, and changes the voltage applied to the gate terminal of the switching element SW according to the control signal. That is, upon receiving the control signal turning on the switching element SW, the gate driver 18-1 applies a relatively high voltage to the gate terminal of the switching element SW such that the switching element SW is turned on. On the other hand, upon receiving the control signal turning off the switching element SW, the gate driver 18-1 applies a relatively low voltage to the gate terminal of the switching element SW such that the switching element SW is turned off. Consequently, the gate driver 18-1 switches between the turn-on and the turn-off of the switching element SW of the power factor improvement circuit 12 in timing instructed by the control circuit 19.

The gate driver 18-2 receives the control signal switching between the turn-on and the turn-off of each of the switching elements 13-1 to 13-4 from the control circuit 19, and changes the voltage applied to the gate terminal of each of the switching elements 13-1 to 13-4 according to the control signal. That is, in the case that the inverter 13 performs the full-bridge operation, upon receiving the control signal turning on the switching elements 13-1 and 13-4, the gate driver 18-2 applies a relatively high voltage to the gate terminals of the switching elements 13-1 and 13-4 such that the switching elements 13-1 and 13-4 are turned on. Consequently, the current from the power source 11 is passed through the switching element 13-1, the transmission coil 14, and the switching element 13-4. On the other hand, upon receiving the control signal turning off the switching elements 13-1 and 13-4, the gate driver 18-2 applies a relatively low voltage to the gate terminals of the switching elements 13-1 and 13-4 such that the switching elements 13-1 and 13-4 are turned off, and such that the current from the power source 11 is not passed through the switching elements 13-1 and 13-4. The gate driver 18-2 also controls the voltage applied to the gate terminal of each of the switching elements 13-2 and 13-3. Thus, when the switching elements 13-1 and 13-4 are turned off and when the switching elements 13-2 and 13-3 are turned on, the current from the power source 11 is passed through the switching element 13-3, the transmission coil 14, and the switching element 13-2.

While the inverter 13 performs the half-bridge operation, upon receiving a control signal from the control circuit 19, the control signal turning on one of the switching elements 13-3 and 13-4 while turning off the other, the gate driver 18-2 applies a relatively high voltage to a gate terminal of the one of the switching elements 13-3 and 13-4 so as to turn on the one of the switching elements 13-3 and 13-4, and applies a relatively low voltage to a gate terminal of the other so as to turn off the other. The gate driver 18-2 applies a relatively high voltage to the gate terminals of the switching elements 13-1 and 13-2 so as to alternately turn on the switching elements 13-1 and 13-2. Consequently, the current from the power source 11 is passed through one of the switching elements 13-3 and 13-4, the transmission coil 14, and one of the switching elements 13-1 and 13-2.

For example, the control circuit 19 includes a nonvolatile memory circuit and a volatile memory circuit, an arithmetic circuit, and an interface circuit that connects the control circuit 19 to another circuit. The control circuit 19 switches whether the inverter 13 of the power supply circuit 10 is caused to perform the full-bridge operation or the half-bridge operation according to the measured value of the voltage output from the power source 11 by the voltage detection circuit 16. Each time the control circuit 19 receives the determination information from the receiver 17, the control circuit 19 controls the switching frequency and the voltage of the AC power supplied from the power supply circuit 10 to the transmission coil 14 according to the determination information.

In the embodiment, the control circuit 19 compares the measured value of the voltage that is output from the power source 11 and received from the voltage detection circuit 16 to a predetermined voltage. In the case that the measured value is less than the predetermined voltage, the control circuit 19 outputs the control signal to the gate driver 18-2 so as to cause the inverter 13 to perform the full-bridge operation. On the other hand, in the case that the measured value of the output voltage is greater than or equal to the predetermined voltage, the control circuit 19 outputs the control signal to the gate driver 18-2 so as to cause the inverter 13 to perform the half-bridge operation. Consequently, in the case that the inverter 13 performs the full-bridge operation, the control circuit 19 can adjust the voltage output from the resonance circuit 20 to a target value of the voltage output from the resonance circuit 20 of the power receiving device 3 even if the voltage input to the power supply circuit 10 is too high with respect to the target value. In the case that the inverter 13 performs the half-bridge operation, the voltage supplied from the power supply circuit 10 to the transmission coil 14 may be stepped down with respect to the voltage input to the power supply circuit 10.

For example, the predetermined voltage is set to a minimum value of the output voltage of the power source 11. At the minimum value of the output voltage of the power source 11, the non-contact feeding device 1 can perform the constant voltage output operation by setting the degree of boosting by the power factor improvement circuit 12 to an adjustable minimum degree in the case that the degree of coupling between the transmission coil 14 and the receiving coil 21 becomes a prospected maximum value while the inverter 13 performs the full-bridge operation.

In the case that the inverter 13 performs the full-bridge operation, the control circuit 19 controls the switching elements 13-1 to 13-4 through the gate driver 18-2 such that the pair of the switching elements 13-1 and 13-4 and the pair of the switching elements 13-2 and 13-3 are alternately turned on, and such that a period during which the pair of the switching elements 13-1 and 13-4 is turned on is equal to a period during which the pair of the switching elements 13-2 and 13-3 is turned on in one cycle corresponding to the switching frequency. In order to prevent the pair of the switching elements 13-1 and 13-4 and the pair of the switching elements 13-2 and 13-3 from being simultaneously turned on to short-circuit the power source 11, a dead time when both the pair of the switching elements 13-1 and 13-4 and the pair of the switching elements 13-2 and 13-3 are turned off may be provided in the control circuit 19 when the pair of the switching elements 13-1 and 13-4 and the pair of the switching elements 13-2 and 13-3 switch between the turn-on and the turn-off.

On the other hand, in the case that the inverter 13 is caused to perform the half-bridge operation, the control circuit 19 controls the switching elements 13-3 and 13-4 through the gate driver 18-2 such that one of the switching elements 13-3 and 13-4 is turned on while the other is turned off. The control circuit 19 controls the switching elements 13-1 and 13-2 through the gate driver 18-2 such that the switching elements 13-1 and 13-2 are alternately turned on, and such that a period during which the switching element 13-1 is turned on is equal to a period during which the switching element 13-2 is turned on in one cycle corresponding to the switching frequency. In order to prevent the switching elements 13-1 and 13-2 from being simultaneously turned on to short-circuit the power source 11, a dead time when both the switching elements 13-1 and 13-2 are turned off may be provided in the control circuit 19 when the switching elements 13-1 and 13-2 switch between the turn-on and the turn-off.

Figure 2:
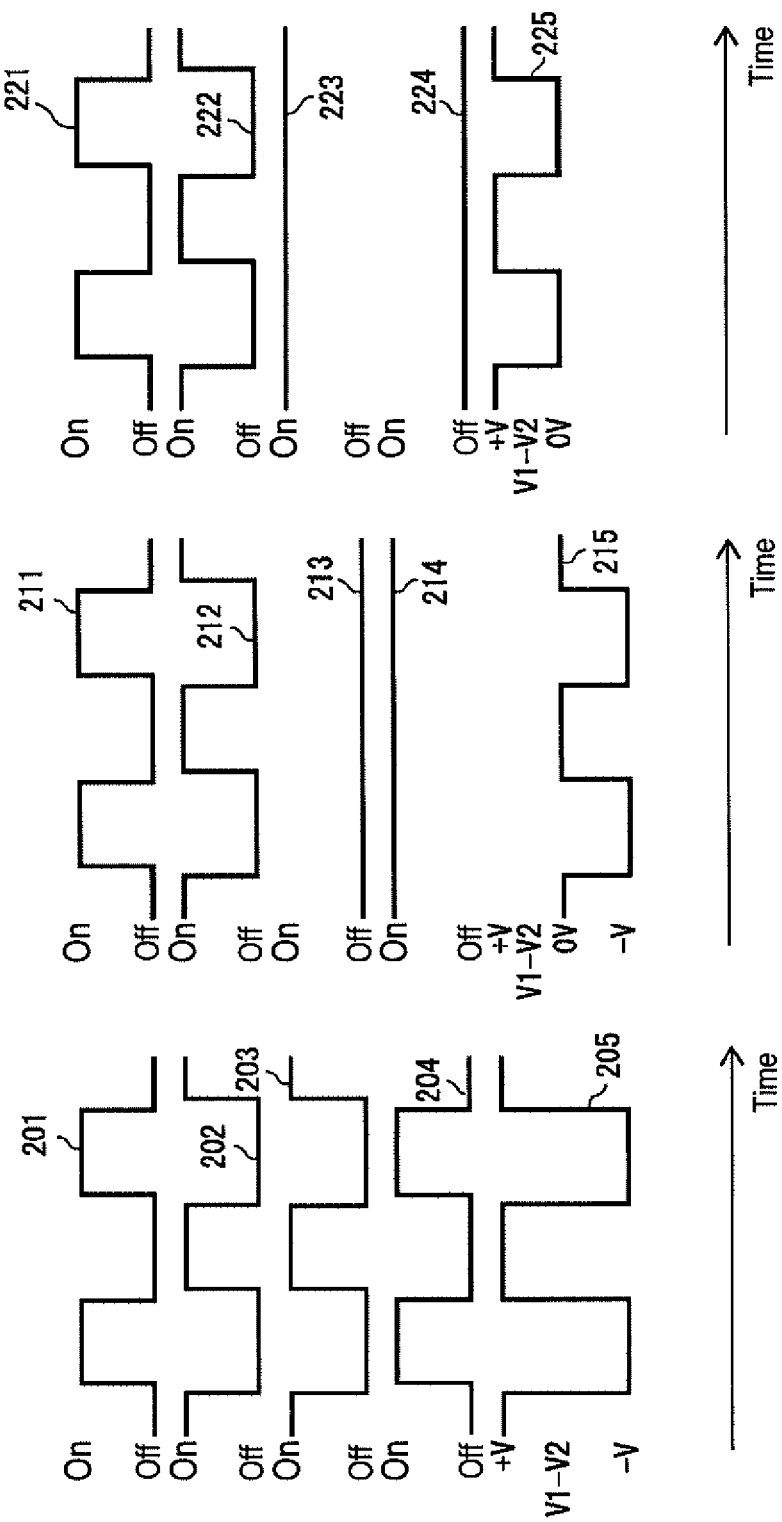
FIG. 2A is a view illustrating an example of a relationship between turn-on and turn-off of each switching element and voltage between both terminals of a transmission coil when an inverter performs full-bridge operation.
FIG. 2B is a view illustrating an example of the relationship between the turn-on and the turn-off of each switching element and the voltage between both the terminals of the transmission coil when the inverter performs half-bridge operation.
FIG. 2C is a view illustrating another example of the relationship between the turn-on and the turn-off of each switching element and the voltage between both the terminals of the transmission coil when the inverter performs the half-bridge operation.

FIG. 2A is a view illustrating an example of a relationship between the turn-on and the turn-off of each of the switching elements 13-1 to 13-4 and the voltage between both terminals of the transmission coil 14 in the case that the inverter 13 performs the full-bridge operation. In FIG. 2A, a horizontal axis represents time. In FIG. 2A, in order from the top, a waveform 201 represents a time change of the turn-on and the turn-off of the switching element 13-1, a waveform 202 represents a time change of the turn-on and the turn-off of the switching element 13-2, a waveform 203 represents a time change of the turn-on and the turn-off of the switching element 13-3, and a waveform 204 represents a time change of the turn-on and the turn-off of the switching element 13-4. A waveform 205 represents a time change in voltage between both the terminals of the transmission coil 14. The power factor improvement circuit 12 outputs voltage V.

As illustrated by the waveforms 201 to 205, in the case that the switching elements 13-1 and 13-4 are turned on while the switching elements 13-2 and 13-3 are turned off, a potential V1 at the terminal of the transmission coil 14 on the side of the capacitor 15 becomes zero, and a potential V2 at the terminal of the transmission coil 14 on the side opposite to the capacitor 15 becomes V. Thus, the voltage (V1-V2) between both the terminals of the transmission coil 14 becomes (−V). On the other hand, in the case that the switching elements 13-1 and 13-4 are turned off while the switching elements 13-2 and 13-3 are turned on, the potential V1 becomes V and the potential V2 becomes zero. Thus, the voltage (V1-V2) between both the terminals of the transmission coil 14 becomes (+V). Consequently, in the case that the inverter 13 performs the full-bridge operation, the AC power having the voltage (2 V) is supplied to the transmission coil 14.

FIG. 2B is a view illustrating an example of the relationship between the turn-on and the turn-off of each of the switching elements 13-1 to 13-4 and the voltage between both the terminals of the transmission coil 14 in the case that the inverter 13 performs the half-bridge operation. In the example of FIG. 2B, it is assumed that while the inverter 13 performs the half-bridge operation, the switching element 13-3 is kept turned off and the switching element 13-4 is kept turned on. In FIG. 2B, the horizontal axis represents the time. In FIG. 2B, in order from the top, a waveform 211 represents the time change of the turn-on and the turn-off of the switching element 13-1, a waveform 212 represents the time change of the turn-on and the turn-off of the switching element 13-2, a waveform 213 represents the time change of the turn-on and the turn-off of the switching element 13-3, and a waveform 214 represents the time change of the turn-on and the turn-off of the switching element 13-4. A waveform 215 represents the time change in voltage between both the terminals of the transmission coil 14. The power factor improvement circuit 12 outputs voltage V.

As illustrated by the waveforms 211 to 215, in the case that the switching element 13-1 is turned on while the switching element 13-2 is turned off, the potential V1 at the terminal of the transmission coil 14 on the side of the capacitor 15 becomes zero, and the potential V2 at the terminal of the transmission coil 14 on the side opposite to the capacitor 15 becomes V. Thus, the voltage (V1-V2) between both the terminals of the transmission coil 14 becomes (−V). On the other hand, in the case that the switching element 13-1 is turned off while the switching element 13-2 is turned on, both the potentials V1 and V2 become zero. Thus, the voltage (V1-V2) between both the terminals of the transmission coil 14 becomes zero. Consequently, in the case that the inverter 13 performs the half-bridge operation, the AC power having the voltage V is supplied to the transmission coil 14.

FIG. 2C is a view illustrating another example of the relationship between the turn-on and the turn-off of each of the switching elements 13-1 to 13-4 and the voltage between both the terminals of the transmission coil 14 in the case that the inverter 13 performs the half-bridge operation. In the example of FIG. 2C, it is assumed that while the inverter 13 performs the half-bridge operation, the switching element 13-3 is kept turned on and the switching element 13-4 is kept turned off. In FIG. 2C, the horizontal axis represents the time. In FIG. 2C, in order from the top, a waveform 221 represents the time change of the turn-on and the turn-off of the switching element 13-1, a waveform 222 represents the time change of the turn-on and the turn-off of the switching element 13-2, a waveform 223 represents the time change of the turn-on and the turn-off of the switching element 13-3, and a waveform 224 represents the time change of the turn-on and the turn-off of the switching element 13-4. A waveform 225 represents the time change in voltage between both the terminals of the transmission coil 14. The power factor improvement circuit 12 outputs voltage V.

As illustrated by the waveforms 221 to 225, in the case that the switching element 13-1 is turned on while the switching element 13-2 is turned off, both the potential V1 at the terminal of the transmission coil 14 on the side of the capacitor 15 and the potential V2 at the terminal of the transmission coil 14 on the side opposite to the capacitor 15 become V. Thus, the voltage (V1-V2) between both the terminals of the transmission coil 14 becomes zero. On the other hand, in the case that the switching element 13-1 is turned off while the switching element 13-2 is turned on, the potential V1 becomes V and the potential V2 becomes zero. Thus, the voltage (V1-V2) between both the terminals of the transmission coil 14 becomes V. In this way, in the case that the inverter 13 performs the half-bridge operation, the AC power having the voltage V is supplied to the transmission coil 14.

Thus, the control circuit 19 can change the voltage of the AC power supplied to the transmission coil 14 by switching between the full-bridge operation and the half-bridge operation of the inverter 13.

In the case that the inverter 13 performs the full-bridge operation, the control circuit 19 selects the duty ratio according to the output voltage from the power source 11 and the switching frequency by referring to a full-bridge operation reference table representing a relationship among the output voltage from the power source 11, the switching frequency, and the duty ratio of the turn-on and turn-off control of the switching element SW of the power factor improvement circuit 12, the duty ratio corresponding to the voltage applied to the transmission coil 14 at which the constant voltage output is obtained at the switching frequency. The control circuit 19 decides timing of switching the switching element SW according to the duty ratio and the change in voltage output from the diode D of the power factor improvement circuit 12, and outputs the control signal indicating the timing to the gate driver 18-1.

Similarly, in the case that the inverter 13 performs the half-bridge operation, the control circuit 19 selects the duty ratio according to the output voltage from the power source 11 and the switching frequency by referring to a half-bridge operation reference table representing a relationship among the output voltage from the power source 11, the switching frequency, and the duty ratio of the turn-on and turn-off control of the switching element SW of the power factor improvement circuit 12, the duty ratio corresponding to the voltage applied to the transmission coil 14 at which the constant voltage output is obtained at the switching frequency. The control circuit 19 decides timing of switching the switching element SW according to the duty ratio and the change in voltage output from the diode D of the power factor improvement circuit 12, and outputs the control signal indicating the timing to the gate driver 18-1.

In the case that the receiver 17 cannot receive the radio signal from the power receiving device 3, it is assumed that the power receiving device 3 does not exist at a position where the power receiving device 3 can receive the power supply from the power transmission device 2, namely, it is assumed that the power transmission device 2 is in a standby state. In this case, the control circuit 19 may set the duty ratio of the turn-on and turn-off control of the switching element SW to a minimum settable value. Alternatively, the control circuit 19 may repeat the control, in which the power supply circuit 10 is operated for a relatively short fixed period (for example, about several seconds) with the duty ratio of the turn-on and turn-off control of the switching element SW as a previously-set value and then the power supply from the power supply circuit 10 to the transmission coil 14 is stopped while each switching element remains turned off for a relatively long period (for example, about several minutes), namely, the control circuit 19 may control the power supply circuit 10 in what is called a burst mode. Consequently, the voltage applied to the transmission coil 14 also becomes the minimum settable value while the power transmission device 2 is in the standby state, so that an energy loss is suppressed.

Details of the control of the switching frequency and the voltage applied to the transmission coil 14 using the control circuit 19 will be described later.

The power receiving device 3 will be described below.

The resonance circuit 20 is an LC resonance circuit including the receiving coil 21 and the resonance capacitor 22, which are connected in parallel to each other. One end of the receiving coil 21 of the resonance circuit 20 is connected to one end of the resonance capacitor 22, and connected to one of input terminals of the rectification smoothing circuit 24 through the coil 23. The other end of the receiving coil 21 is connected to the other end of the resonance capacitor 22, and connected to the other input terminal of the rectification smoothing circuit 24.

The receiving coil 21 resonates with alternating current passed through the transmission coil 14 of the power transmission device 2, thereby receiving the power from the transmission coil 14. The receiving coil 21 outputs the received power to the rectification smoothing circuit 24 through the resonance capacitor 22 and the coil 23. A number of turns of the receiving coil 21 and a number of turns of the transmission coil 14 of the power transmission device 2 may be equal to or different from each other.

One end of the resonance capacitor 22 is connected to one end of the receiving coil 21 and the coil 23, and the other end of the resonance capacitor 22 is connected to the other end of the receiving coil 21 and the rectification smoothing circuit 24. The resonance capacitor 22 outputs the power received by the receiving coil 21 to the rectification smoothing circuit 24 through the coil 23.

The coil 23 is connected between the resonance circuit 20 and the rectification smoothing circuit 24. In the embodiment, in order that the coil 23 is connected in series to the receiving coil 21, one end of the coil 23 is connected to the receiving coil 21 and the resonance capacitor 22 of the resonance circuit 20, and the other end of the coil 23 is connected to the rectification smoothing circuit 24. The coil 23 outputs the power from the resonance circuit 20 to the rectification smoothing circuit 24. Similarly to the SPL system, the harmonic component of the received power is suppressed by providing the coil 23.

The rectification smoothing circuit 24 is an example of the rectifier circuit, includes a full-wave rectifier circuit 25 including four bridge-connected diodes and a smoothing capacitor 26, rectifies and smoothes the power that is received by the resonance circuit 20 through the coil 23, and converts the power into DC power. The rectification smoothing circuit 24 outputs the DC power to the load circuit 27.

The voltage detection circuit 28 measures the output voltage between both the terminals of the rectification smoothing circuit 24 at each predetermined cycle. Because the output voltage between both the terminals of the rectification smoothing circuit 24 corresponds to the output voltage of the resonance circuit 20 in a one-to-one manner, a measured value of the output voltage between both the terminals of the rectification smoothing circuit 24 indirectly becomes a measured value of the output voltage of the resonance circuit 20. For example, any one of various publicly known voltage detection circuits capable of detecting a DC voltage can be used as the voltage detection circuit 28. The voltage detection circuit 28 outputs a voltage detection signal indicating the measured value of the output voltage to the constant voltage determination circuit 29.

Based on the measured value of the output voltage received from the voltage detection circuit 28, the constant voltage determination circuit 29 determines whether the non-contact feeding device 1 performs the constant voltage output operation, and whether the measured value of the output voltage is included in the permissive range of the voltage at which the constant voltage output operation is performed. The constant voltage determination circuit 29 notifies the transmitter 32 of the determination result. For this purpose, for example, the constant voltage determination circuit 29 includes a determination circuit 30 including a memory circuit that stores the permissive range of the voltage and an arithmetic circuit that compares the measured value of the output voltage to the permissive range of the voltage.

The constant voltage determination circuit 29 also includes a switching element 31, such as a MOSFET, which is connected between the rectification smoothing circuit 24 and the load circuit 27. The current is not passed from the rectification smoothing circuit 24 to the load circuit 27 (that is, Rac=∞) when the switching element 31 is turned off. On the other hand, the current is passed from the rectification smoothing circuit 24 to the load circuit 27 when the switching element 31 is turned on. The determination circuit 30 of the constant voltage determination circuit 29 switches between the turn-on and the turn-off of the switching element 31 at a predetermined cycle while the measured value of the output voltage deviates from the permissive range of the voltage. Consequently, a resistance value of a whole circuit including the load circuit 27 changes at the predetermined cycle, the whole circuit being connected to the rectification smoothing circuit 24. Thus, the determination circuit 30 determines whether the measured value of the output voltage is kept substantially constant while switching between the turn-on and the turn-off of the switching element 31, which allows the determination circuit 30 to determine whether the non-contact feeding device 1 performs the constant voltage output operation. Therefore, while the measured value of the output voltage is kept substantially constant even when the switching element 31 switches between the turn-on and the turn-off at a predetermined cycle, the determination circuit 30 notifies the transmitter 32 that the non-contact feeding device 1 performs the constant voltage output operation.

In the case that the non-contact feeding device 1 performs the constant voltage output operation for a fixed period in which the measured value of the output voltage is longer than that of the predetermined cycle, the determination circuit 30 stops the switching between the turn-on and the turn-off of the switching element 31 to keep the switching element 31 in the turn-on state. The determination circuit 30 determines whether the measured value of the output voltage is included in the permissive range of the voltage, and notifies the transmitter 32 of the determination result.

At that point, in the case that the measured value of the output voltage is included in the permissive range of the voltage for the fixed period longer than the predetermined cycle, the determination circuit 30 notifies the transmitter 32 of the determination result indicating that the non-contact feeding device 1 performs the constant voltage output operation, and indicating that the measured value of the output voltage falls within the permissive range of the voltage.

According to a modification, the constant voltage determination circuit 29 may include a resistor connected in parallel to the load circuit 27 with respect to the rectification smoothing circuit 24. In this case, the switching element 31 may be provided so as to be connected in series to the resistor and in parallel to the load circuit 27. In this case, the determination circuit 30 turns off the switching element 31 while the measured value of the output voltage is included in the permissive range of the voltage. On the other hand, when the measured value of the output voltage deviates from the permissive range of the voltage, the determination circuit 30 may switch between the turn-on and the turn-off of the switching element 31 at the predetermined cycle similarly to the above embodiment. In the modification, the power supply to the load circuit 27 is continued even when the non-contact feeding device 1 does not perform the constant voltage output operation.

According to still another modification, a second switching element such as a MOSFET may be provided in parallel to the above resistor and in series to the load circuit 27. In this case, while the measured value of the output voltage is included in the permissive range of the voltage, the determination circuit 30 turns on the second switching element to enable the power supply to the load circuit 27. On the other hand, when the measured value of the output voltage deviates from the permissive range of the voltage, the determination circuit 30 may turn off the second switching element to stop the power supply to the load circuit 27. Consequently, even when the voltage of the received power becomes excessively high while the switching frequency is adjusted by the power transmission device 2, the excessively high voltage is prevented from being applied to the load circuit 27.

In each predetermined transmission cycle, the transmitter 32 generates a radio signal including the determination information indicating whether the non-contact feeding device 1 performs the constant voltage output operation and whether the measured value of the output voltage is included in the permissive range of the voltage according to the determination result received from the determination circuit 30 of the constant voltage determination circuit 29, and transmits the radio signal to the receiver 17 of the power transmission device 2. For this purpose, for example, the transmitter 32 includes a communication circuit that generates the radio signal pursuant to a predetermined radio communication standard and an antenna that outputs the radio signal. Similarly to the receiver 17, examples of the predetermined radio communication standard include ISO/IEC 15693, ZigBee (registered trademark), and Bluetooth (registered trademark).

Details of the operation of the non-contact feeding device 1 will be described below.

In the embodiment, the control circuit 19 of the power transmission device 2 controls the switching frequency and the voltage of the AC power supplied from the power supply circuit 10 to the transmission coil 14 such that the non-contact feeding device 1 continues the constant voltage output operation based on the determination information received from the receiver 17.

The non-contact feeding device 1 of the embodiment has the same configuration as that of the SPL system, although the non-contact feeding device 1 does not use the resonance on the power transmission side. For this reason, the frequency characteristic of the output voltage of the non-contact feeding device 1 is similar to the frequency characteristic of the output voltage of the SPL system non-contact feeding device when the resonance frequency of the resonance circuit on the power transmission side is decreased by increasing the capacitance of the capacitor connected in series to the transmission coil.

Figure 3:
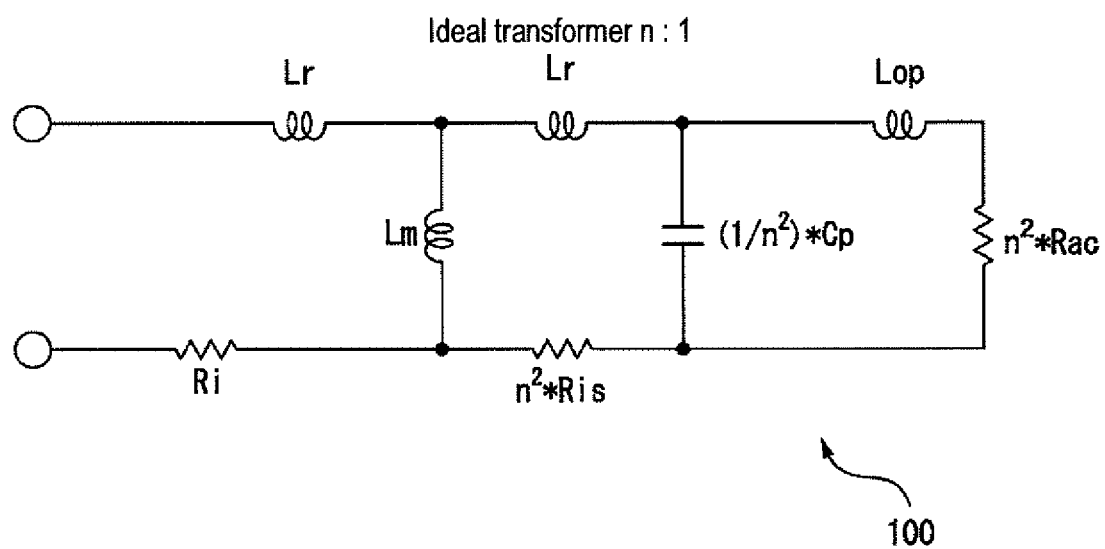
FIG. 3 is an equivalent circuit diagram illustrating the non-contact feeding device of the embodiment.

FIG. 3 is an equivalent circuit diagram of the non-contact feeding device 1. In an equivalent circuit 100, it is assumed that the transmission coil 14 on the power transmission side and the receiving coil 21 of the resonance circuit 20 on the power receiving side are coupled to form an ideal transformer of n:1. The transmission coil 14 on the power transmission side has leakage inductance Lr and excitation inductance Lm. Inductance Lp of the transmission coil 14 on the power transmission side is equal to (Lm+Lr). Assuming that k is the degree of coupling between the transmission coil 14 and the receiving coil 21, Lr=(1−k) Lp and Lm=kLp are obtained. The power transmission side has a winding resistance value Ri, and the power receiving side has a winding resistance value Ris. In the resonance circuit 20 on the power receiving side, the resonance capacitor 22 connected in parallel to the receiving coil 21 has capacitance Cp. The coil 23 connected in series to the receiving coil 21 has inductance Lop. The load circuit 27 has an AC equivalent resistance value Rac, and the AC equivalent resistance value Rac is represented by Rac=$(8/\pi^2)$×Ro using a resistance value Ro of the load circuit 27.

Figure 4:
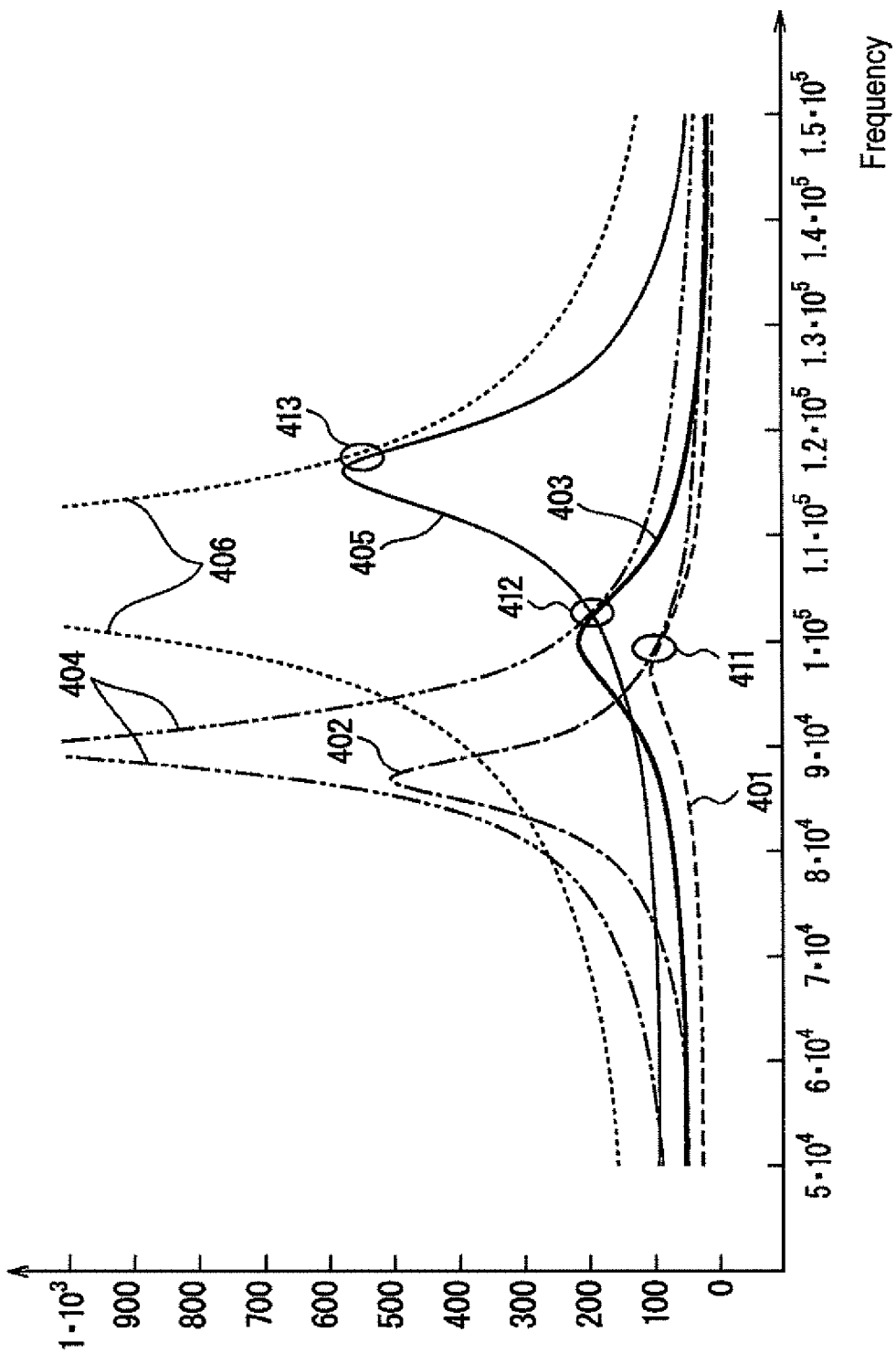
FIG. 4 is a view illustrating an example of a simulation result of a frequency characteristic of an output voltage in the non-contact feeding device of the embodiment.

FIG. 4 is a view illustrating an example of a simulation result of a frequency characteristic of the output voltage in the non-contact feeding device 1 of the embodiment. In FIG. 4, the horizontal axis represents the frequency and the vertical axis represents the output voltage. This simulation was made under the conditions of Lp=174 µH, Cp=20 nF, Lop=3Lp, Ri=Ris=0.3Ω, n=1, voltage Vin of the AC power supplied to the transmission coil 14=200 V, and Ro=200Ω (Rac≈162.1Ω). A curve 401 represents the frequency characteristic of the output voltage when the degree of coupling k is set to 0.15 and when the AC equivalent resistance value of the load circuit 27 is set to Rac. A curve 402 represents the frequency characteristic of the output voltage when the degree of coupling k is set to 0.15 and when the AC equivalent resistance value of the load circuit 27 is set to (10*Rac). A curve 403 represents the frequency characteristic of the output voltage when the degree of coupling k is set to 0.3 and when the AC equivalent resistance value of the load circuit 27 is set to Rac. A curve 404 represents the frequency characteristic of the output voltage when the degree of coupling k is set to 0.3 and when the AC equivalent resistance value of the load circuit 27 is set to (10*Rac). A curve 405 represents the frequency characteristic of the output voltage when the degree of coupling k is set to 0.6 and when the AC equivalent resistance value of the load circuit 27 is set to Rac. A curve 406 represents the frequency characteristic of the output voltage when the degree of coupling k is set to 0.6 and when the AC equivalent resistance value of the load circuit 27 is set to (10*Rac).

As illustrated in FIG. 4, a combination of the frequency and the output voltage, in which the output voltage is kept substantially constant (that is, the constant voltage output is obtained) even when the AC equivalent resistance value of the load circuit 27 changes under the condition that the degree of coupling k does not change, exists in each degree of coupling (three combinations, that is, the points 411 to 413 in FIG. 4). Thus, even when the AC power having the switching frequency at which the transmission coil 14 does not resonate is applied to the transmission coil 14, the non-contact feeding device 1 can be caused to perform the constant voltage output operation with respect to the change in the resistance value of the load circuit 27. As indicated by the points 411 to 413, although the output voltages at the time the constant voltage is output in relation to the fluctuation in resistance value of the load circuit 27 varies according to the degree of coupling, the difference in output voltage can be set to the substantially constant output voltage irrespective of the degree of coupling by adjusting the voltage applied to the transmission coil 14.

Figure 5:
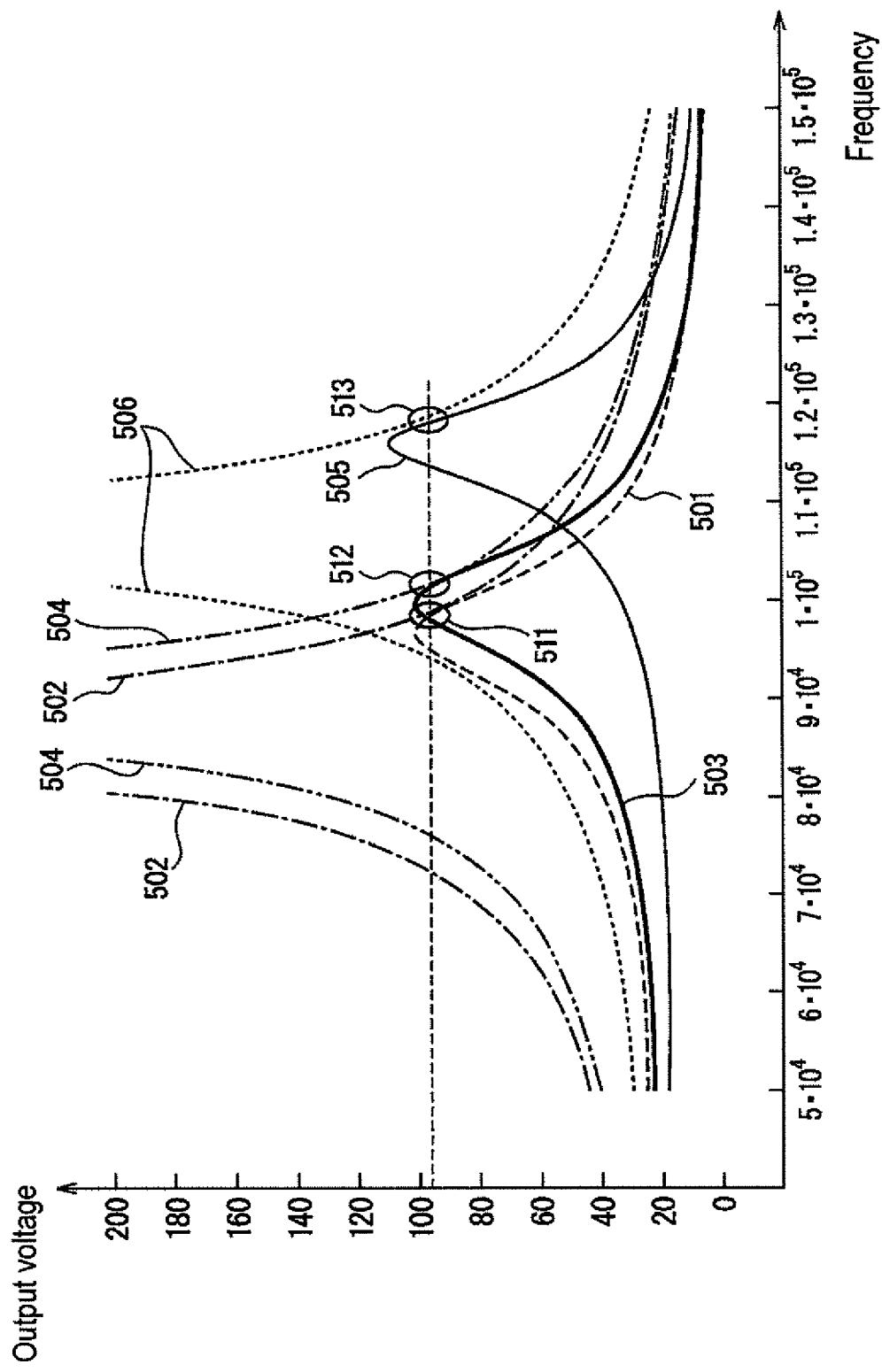
FIG. 5 is a view illustrating an example of the simulation result of the frequency characteristic of the output voltage when voltage applied to the transmission coil is changed according to a degree of coupling in the simulation of FIG. 4.

FIG. 5 is a view illustrating an example of the simulation result of the frequency characteristic of the output voltage when the voltage applied to the transmission coil 14 is changed according to the degree of coupling in the simulation of FIG. 4. In FIG. 5, the horizontal axis represents the frequency and the vertical axis represents the output voltage. A curve 501 represents the frequency characteristic of the output voltage when the degree of coupling k is set to 0.15, when the AC equivalent resistance value of the load circuit 27 is set to Rac, and when the voltage applied to the transmission coil 14 is set to Vin. A curve 502 represents the frequency characteristic of the output voltage when the degree of coupling k is set to 0.15, when the AC equivalent resistance value of the load circuit 27 is set to (10*Rac), and when the voltage applied to the transmission coil 14 is set to Vin. A curve 503 represents the frequency characteristic of the output voltage when the degree of coupling k is set to 0.3, when the AC equivalent resistance value of the load circuit 27 is set to Rac, and when the voltage applied to the transmission coil 14 is set to (0.47*Vin). A curve 504 represents the frequency characteristic of the output voltage when the degree of coupling k is set to 0.3, when the AC equivalent resistance value of the load circuit 27 is set to (10*Rac), and when the voltage applied to the transmission coil is set to (0.47*Vin). A curve 505 represents the frequency characteristic of the output voltage when the degree of coupling k is set to 0.6, when the AC equivalent resistance value of the load circuit 27 is set to Rac, and when the voltage applied to the transmission coil is set to (0.19*Vin). A curve 506 represents the frequency characteristic of the output voltage when the degree of coupling k is set to 0.6, when the AC equivalent resistance value of the load circuit 27 is set to (10*Rac), and when the voltage applied to the transmission coil is set to (0.19*Vin).

There are three combinations of the frequency and the output voltage, that is, the points 511 to 513, in which the output voltage is kept substantially constant (that is, the constant voltage output is obtained) even when the AC equivalent resistance value of the load circuit 27 changes under the condition that the degree of coupling k does not change, the combination of the frequency and the output voltage corresponding to the points 411 to 413 in FIG. 4. The output voltages of the points 511 to 513 are substantially equal to one another.

As described above, even when either the resistance value or the degree of coupling of the load circuit 27 fluctuates, the output voltage is kept substantially constant by properly adjusting the switching frequency and the voltage of the AC power applied to the transmission coil 14.

In order to achieve the constant voltage output operation, the control circuit 19 controls the switching frequency and the voltage of the AC power applied to the transmission coil 14 as described below.

In the case that the determination information included in the radio signal received from the power receiving device 3 through the receiver 17 indicates that the non-contact feeding device 1 does not perform the constant voltage output operation, the control circuit 19 changes the switching frequency of the AC power within a predetermined frequency domain. For example, the predetermined frequency domain can be set to a frequency domain where a frequency at which the constant voltage output is obtained in the minimum value of the prospected degree of coupling between the transmission coil 14 and the receiving coil 21 is set to the lower limit while a frequency at which the constant voltage output is obtained in the maximum value of the prospected degree of coupling between the transmission coil 14 and the receiving coil 21 is set to the upper limit in the case that the power is fed from the power transmission device 2 to the power receiving device 3.

When changing the switching frequency, the control circuit 19 may sequentially increase the switching frequency from the lower limit to the upper limit of the predetermined frequency domain, or sequentially decrease the switching frequency from the upper limit to the lower limit of the predetermined frequency-domain. At this point, the control circuit 19 preferably changes the switching frequency stepwise such that the constant voltage determination circuit 29 of the power receiving device 3 can check whether the output voltage is kept substantially constant and such that the same switching frequency is kept longer than the cycle during which the determination circuit 30 of the constant voltage determination circuit 29 switches the switching element 31.

The control circuit 19 preferably decreases the voltage applied to the transmission coil 14 to the lower limit voltage while the switching frequency is adjusted. Consequently, the voltage of the power supplied to the power receiving device 3 is suppressed from becoming excessively high.

When the determination information included in the radio signal received from the power receiving device 3 through the receiver 17 indicates that the measured value of the output voltage is kept substantially constant even when the resistance of the load circuit changes although the measured value of the output voltage is not included in the permissive range of the voltage, namely, that the constant voltage output operation is performed, the control circuit 19 keeps the switching frequency constant accordingly. The control circuit 19 decides the duty ratio by referring to the reference table representing the relationship among the output voltage from the power source 11, the switching frequency, and the duty ratio of the turn-on and turn-off control of the switching element SW of the power factor improvement circuit 12, the constant voltage output being obtained at the switching frequency irrespective of the degree of coupling at the duty ratio. At that time, in the case that the output voltage from the power source 11 is less than the predetermined voltage while the inverter 13 performs the full-bridge operation, the control circuit 19 refers to the full-bridge operation reference table to decide the duty ratio. On the other hand, in the case that the output voltage from the power source 11 is greater than or equal to the predetermined voltage while the inverter 13 performs the half-bridge operation, the control circuit 19 refers to the half-bridge operation reference table to decide the duty ratio.

The control circuit 19 controls the gate driver 18-1 so as to switch the switching element SW of the power factor improvement circuit 12 according to the duty ratio. Consequently, the voltage applied to the transmission coil 14 is adjusted such that the output voltage from the resonance circuit 20 is included in the permissive range of the voltage, namely, such that the constant voltage is output irrespective of the degree of coupling. When the determination information included in the radio signal received from the power receiving device 3 through the receiver 17 indicates that the measured value of the output voltage is included in the permissive range of the voltage, the control circuit 19 keeps the switching frequency and the voltage of the AC power supplied to the transmission coil 14 constant.

Instead of referring to the reference table to decide the duty ratio, the control circuit 19 may gradually change the duty ratio until the determination information included in the radio signal received from the power receiving device 3 through the receiver 17 indicates that the measured value of the output voltage is included in the permissive range of the voltage.

In order to improve energy transmission efficiency, preferably the power supply circuit 10 and the transmission coil 14 of the power transmission device 2 continuously perform soft switching (inductive) operation. In order that the power supply circuit 10 and the transmission coil 14 perform the soft switching operation, preferably the phase of the current passed through the transmission coil 14 is delayed from the phase of the applied voltage. Consequently, for example, when the switching elements 13-1 and 13-4 are turned on, the current is passed from the source terminal to the drain terminal of the switching element 13-1, so that the power supply circuit 10 and the transmission coil 14 performs the soft switching operation to suppress generation of a switching loss.

Figure 6:
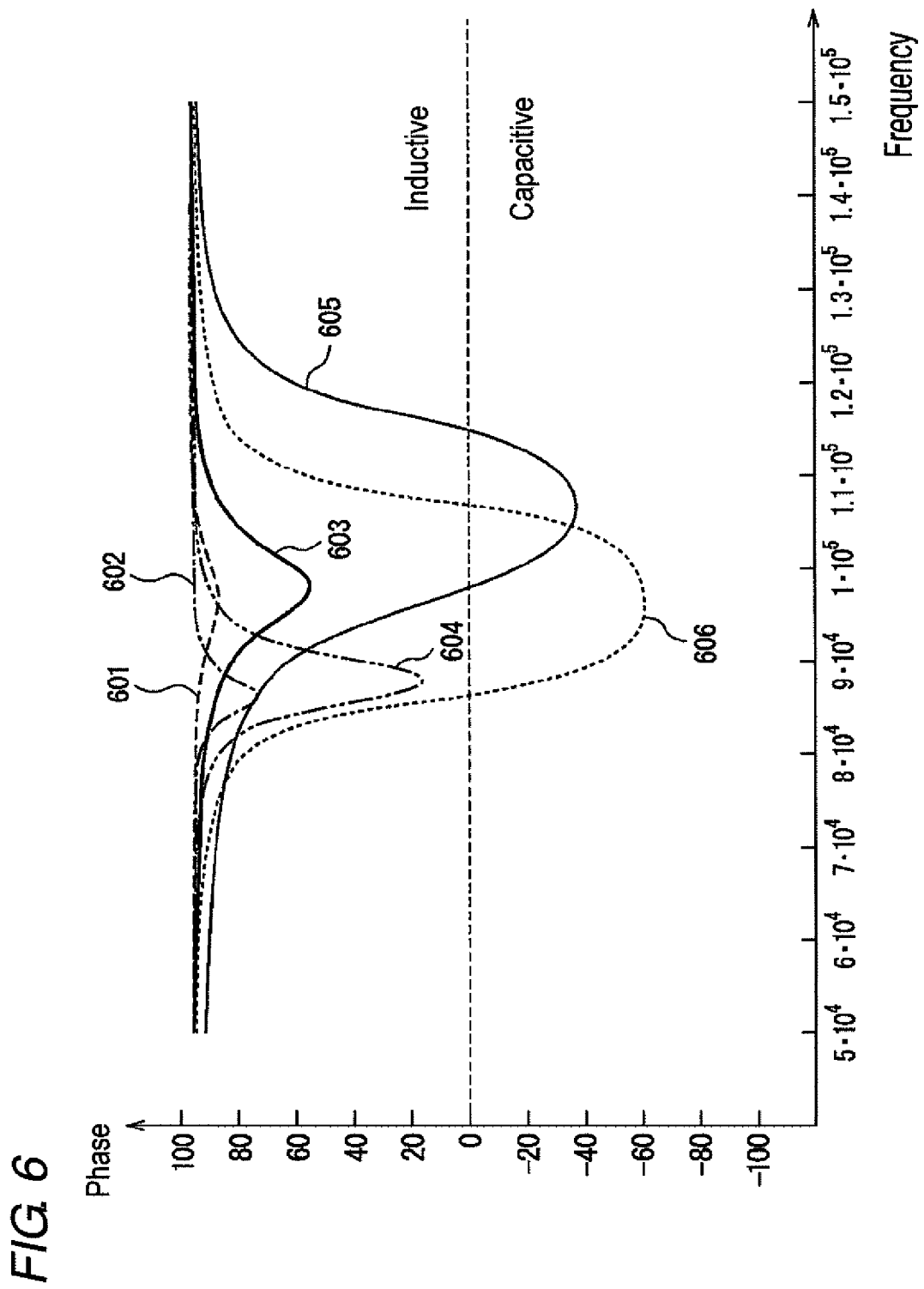
FIG. 6 is a view illustrating the frequency characteristic of a delay of a current phase with respect to a voltage phase for AC power applied to the transmission coil in the non-contact feeding device of the embodiment.

FIG. 6 is a view illustrating the frequency characteristic of the delay of the current phase with respect to the voltage phase for the AC power applied to the transmission coil 14 in the non-contact feeding device 1 of the embodiment. In FIG. 6, the horizontal axis represents the frequency and the vertical axis represents the phase. In FIG. 6, the case that the phase has a positive value indicates that the current phase is delayed with respect to the voltage phase. A curve 601 represents the frequency characteristic of the phase delay when the degree of coupling k is set to 0.15 and when the AC equivalent resistance value of the load circuit is set to Rac. A curve 602 represents the frequency characteristic of the phase delay when the degree of coupling k is set to 0.15 and when the AC equivalent resistance value of the load circuit is set to (10*Rac). A curve 603 represents the frequency characteristic of the phase delay when the degree of coupling k is set to 0.3 and when the AC equivalent resistance value of the load circuit is set to Rac. A curve 604 represents the frequency characteristic of the phase delay when the degree of coupling k is set to 0.3 and when the AC equivalent resistance value of the load circuit is set to (10*Rac). A curve 605 represents the frequency characteristic of the phase delay when the degree of coupling k is set to 0.6 and when the AC equivalent resistance value of the load circuit is set to Rac. A curve 606 represents the frequency characteristic of the phase delay when the degree of coupling k is set to 0.6 and when the AC equivalent resistance value of the load circuit is set to (10*Rac).

As can be seen from the curves 601 to 606, in the frequency domain including the frequencies corresponding to the points 511 to 513 in FIG. 5, namely, in the frequency domain where the non-contact feeding device 1 performs the constant voltage output operation, the delay of the phase has a positive value with respect to the combination of the degree of coupling and the frequency at which the constant voltage output operation is obtained. Thus, the non-contact feeding device 1 of the embodiment can perform the soft switching operation of the power supply circuit 10 and the transmission coil 14.

As described above, the non-contact feeding device switches between the full-bridge operation and the half-bridge operation of the inverter of the power supply circuit according to the voltage input to the power supply circuit that supplies the AC power to the transmission coil of the power transmission device. This enables the non-contact feeding device to expand a permissive fluctuation range of the voltage input to the power supply circuit, the constant voltage output operation being able to be performed in the permissive fluctuation range. Thus, even when the voltage input to the power supply circuit fluctuates, the non-contact feeding device can keep the output voltage on the power receiving side constant. The non-contact feeding device can expand the permissive fluctuation range of the voltage input to the power supply circuit, so that various commercial power sources having different rated voltages can be used for the input to the power supply circuit. In the non-contact feeding device, the circuit configuration can be simplified using the inverter capable of performing both the full-bridge operation and the half-bridge operation.

According to a modification, the power supply circuit of the power transmission device may separately include an inverter that performs the full-bridge operation and an inverter that performs the half-bridge operation.

Figure 7:
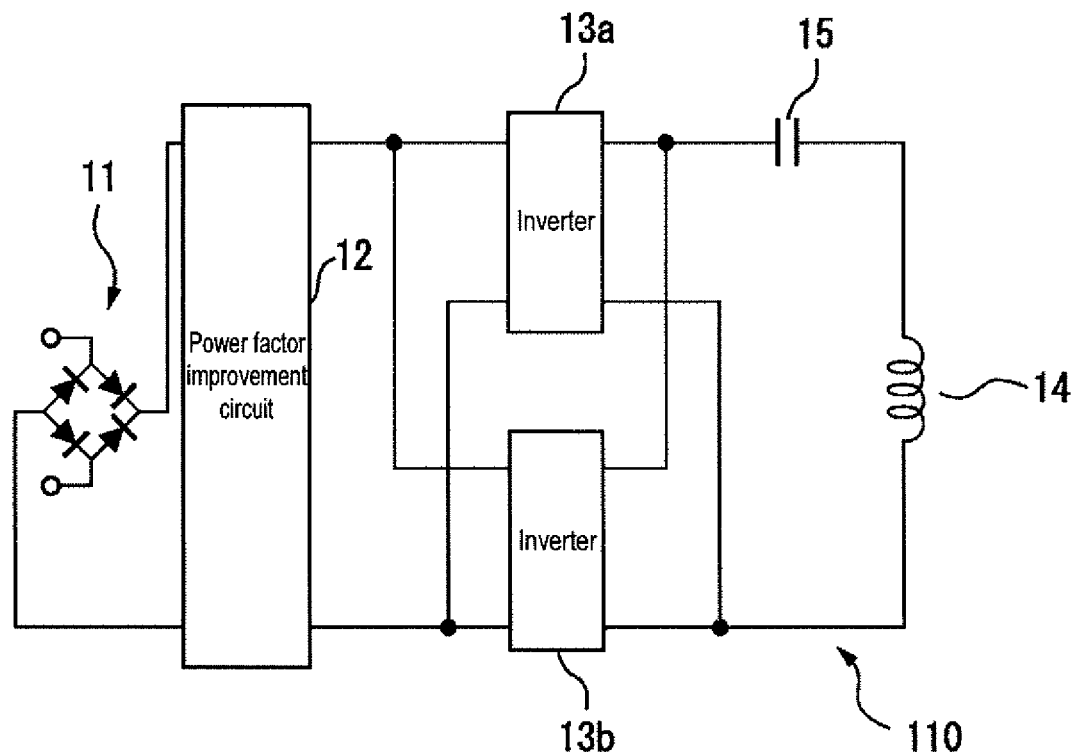
FIG. 7 is a schematic configuration diagram illustrating a power supply circuit according to a modification.

FIG. 7 is a schematic configuration diagram illustrating the power supply circuit of this modification. A power supply circuit 110 of this modification includes the power source 11, the power factor improvement circuit 12, an inverter 13a, and an inverter 13b. The power supply circuit 110 of this modification is different from the power supply circuit 10 of the embodiment in that the power supply circuit 110 includes two types of inverters. The different points and related points will be described below.

In this modification, the inverters 13a and 13b are connected in parallel to each other between the power factor improvement circuit 12 and the transmission coil 14. Both the inverters 13a and 13b are controlled by the control circuit 19 through the gate driver 18-2. The inverter 13a is an inverter capable of performing the full-bridge operation. For example, the inverter 13a has the same configuration as that of the inverter 13 of the embodiment. On the other hand, the inverter 13b is an inverter capable of performing the half-bridge operation.

Figure 8:
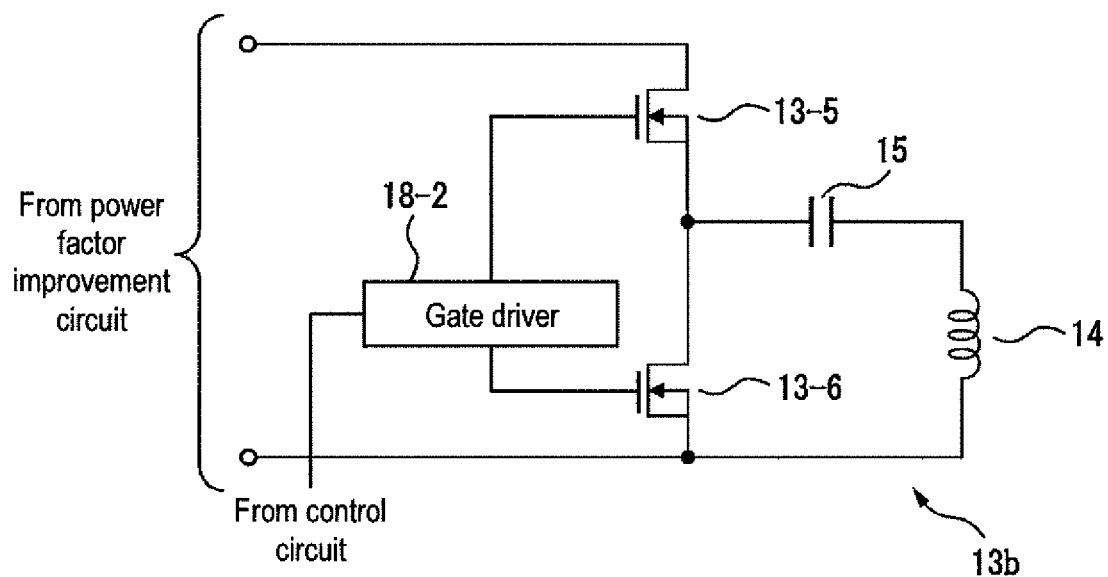
FIG. 8 is a circuit diagram illustrating an inverter that is included in the power supply circuit of the modification and performs the half-bridge operation.

FIG. 8 is a circuit diagram of the inverter 13b. In the example of FIG. 8, the inverter 13b includes two switching elements 13-5 and 13-6 connected in series between the positive-side terminal and the negative-side terminal of the power source 11. For example, an n-channel type MOSFET can be used as each switching element. The switching element 13-5 is connected to the positive side of the power source 11, and the switching element 13-6 is connected to the negative side of the power source 11. The drain terminal of the switching element 13-5 is connected to the positive-side terminal of the power source 11 through the power factor improvement circuit 12, and the source terminal of the switching element 13-5 is connected to the drain terminal of the switching element 13-6. The source terminal of the switching element 13-6 is connected to the negative-side terminal of the power source 11 through the power factor improvement circuit 12. The source terminal of the switching element 13-6 and the drain terminal of the switching element 13-5 are connected to one end of the transmission coil 14 through the capacitor 15, and the source terminal of the switching element 13-6 is connected to the other end of the transmission coil 14. The gate terminal of each switching element is connected to the gate driver 18-2.

In the case that the voltage output from the power source 11 is less than a predetermined voltage, the control circuit 19 outputs the control signal turning off both the switching elements 13-5 and 13-6 of the inverter 13b to the gate driver 18-2. The gate driver 18-2 applies voltage at which the switching elements 13-5 and 13-6 are turned off to the gate terminals of the switching elements 13-5 and 13-6. On the other hand, the control circuit 19 may control the turn-on and the turn-off of each switching element of the inverter 13a similarly to the case that the inverter 13 performs the full-bridge operation in the embodiment.

On the other hand, in the case that the voltage output from the power source 11 is greater than or equal to the predetermined voltage, the control circuit 19 outputs the control signal turning off each switching element of the inverter 13a to the gate driver 18-2. The gate driver 18-2 applies voltage at which each switching element is turned off to the gate terminal of each switching element of the inverter 13a. The control circuit 19 controls the switching elements 13-5 and 13-6 such that the inverter 13b performs the half-bridge operation, such that the switching elements 13-5 and 13-6 are alternately turned on, and such that a period during which the switching element 13-5 is turned on is equal to a period during which the switching element 13-6 is turned on in one cycle corresponding to the switching frequency.

In this modification, the control circuit 19 can switch the inverter that supplies the AC power to the transmission coil 14 between the inverter 13a that performs the full-bridge operation and the inverter 13b that performs the half-bridge operation according to the voltage input to the power supply circuit 110. Thus, similarly to the embodiment, the non-contact feeding device having the power supply circuit of this modification can expand the permissive fluctuation range of the voltage input to the power supply circuit, the constant voltage output operation being able to be performed in the permissive fluctuation range.

According to another modification, the power supply circuit may include a DC-DC converter and a circuit that short-circuits the DC-DC converter between the power factor improvement circuit and the inverter.

Figure 9:
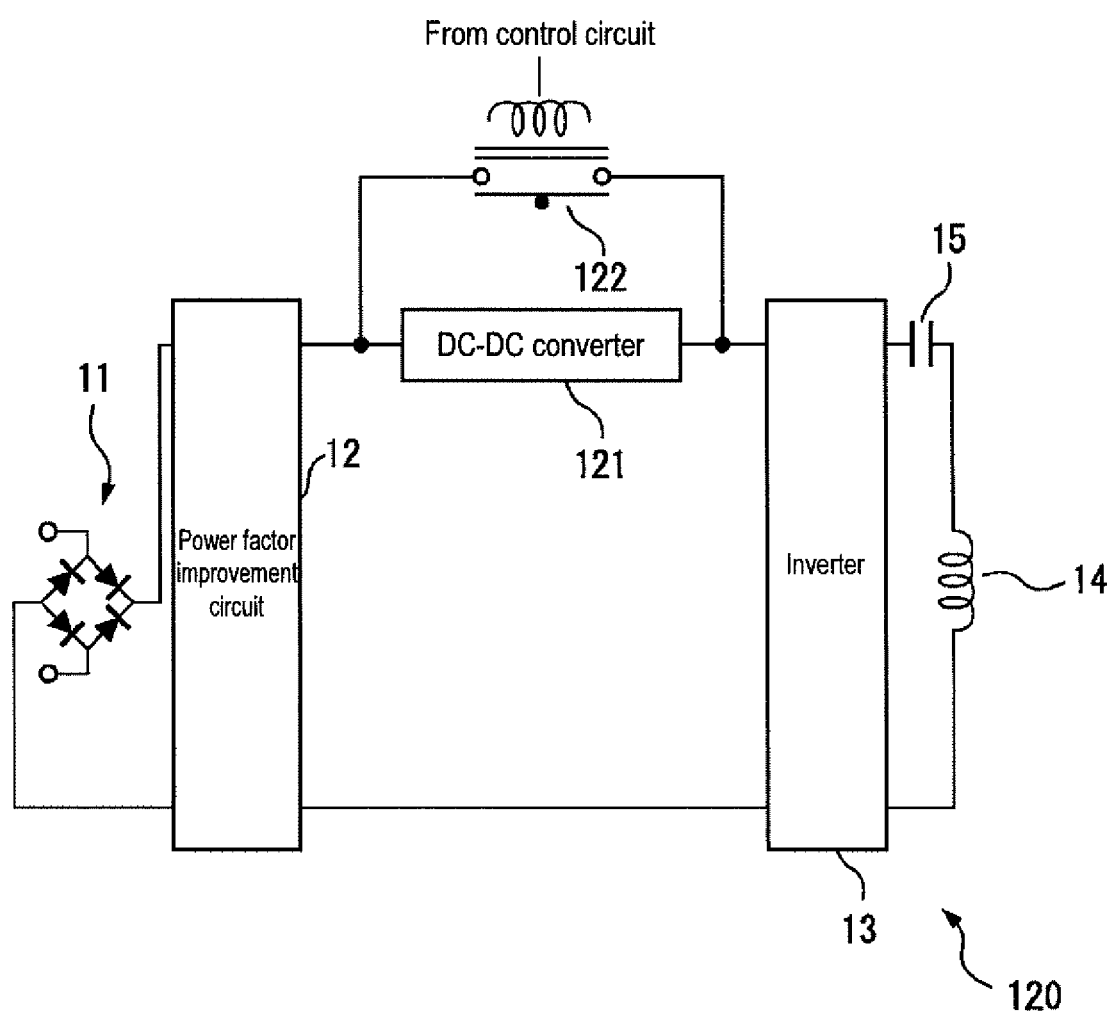
FIG. 9 is a schematic configuration diagram illustrating a power supply circuit according to another modification.

FIG. 9 is a schematic configuration diagram illustrating the power supply circuit of this modification. A power supply circuit 120 of this modification includes the power source 11, the power factor improvement circuit 12, the inverter 13, a DC-DC converter 121, and a relay 122. The power supply circuit 120 of this modification is different from the power supply circuit 10 of the embodiment in that the power supply circuit 120 includes the DC-DC converter 121 and the relay 122. The different points and related points will be described below.

The DC-DC converter 121 is an example of a voltage converter, and is connected between the power factor improvement circuit 12 and the inverter 13. Then, the DC-DC converter 121 steps down the DC voltage output from the power factor improvement circuit 12. For example, the DC-DC converter 121 decreases the DC voltage output from the power factor improvement circuit 12 to about a half voltage. For this purpose, the DC-DC converter 121 can be constructed with a publicly known step-down DC-DC converter.

The voltage output from the DC-DC converter 121 is input to the inverter 13.

The relay 122 is an example of a short circuit, and is provided in parallel to the DC-DC converter 121. The relay 122 is turned on to short-circuit the input and the output of the DC-DC converter 121 such that the DC voltage output from the power factor improvement circuit 12 is input to the inverter 13 with no use of the DC-DC converter 121.

In the case that the voltage output from the power source 11 is less than the predetermined voltage, the control circuit 19 turns on the relay 122 such that the DC voltage output from the power factor improvement circuit 12 is input to the inverter 13 with no use of the DC-DC converter 121. On the other hand, in the case that the voltage output from the power source 11 is greater than or equal to the predetermined voltage, the control circuit 19 turns off the relay 122 such that the DC voltage output from the power factor improvement circuit 12 is supplied to the inverter 13 through the DC-DC converter 121. In the case that the DC voltage is input to the inverter 13 through the DC-DC converter 121, the power supply circuit 120 may step down the input voltage as a whole. The control circuit 19 may perform the full-bridge operation of the inverter 13 regardless of the voltage output from the power source 11.

In this modification, the control circuit 19 can adjust the degree of boosting or step-down of the voltage applied to the transmission coil 14 with respect to the voltage input to the power supply circuit 120 by switching whether to short-circuit the DC-DC converter 121 according to the voltage input. Thus, similarly to the embodiment, the non-contact feeding device having the power supply circuit of this modification can expand the permissive fluctuation range of the voltage input to the power supply circuit, the constant voltage output operation being able to be performed in the permissive fluctuation range.

The DC-DC converter 121 may be a boosting type DC-DC converter. In this case, in the case that the voltage output from the power source 11 is less than the predetermined voltage, the control circuit 19 turns off the relay 122 such that the DC voltage output from the power factor improvement circuit 12 is supplied to the inverter 13 through the DC-DC converter 121. On the other hand, in the case that the voltage output from the power source 11 is greater than or equal to the predetermined voltage, the control circuit 19 turns on the relay 122 such that the DC voltage output from the power factor improvement circuit 12 is supplied to the inverter 13 with no use of the DC-DC converter 121. In this case, the control circuit 19 may perform the half-bridge operation of the inverter 13 regardless of the voltage output from the power source 11.

According to still another modification, in the resonance circuit of the power receiving device, the receiving coil and the resonance capacitor may be connected in series similarly to the series and series (SS) system non-contact feeding device. In this case, because the non-contact feeding device can perform the constant voltage output operation, the degree of boosting or step-down of the voltage applied to the transmission coil with respect to the input voltage may be adjusted according to the voltage input to the power supply circuit similarly to the embodiment or modification.

Figure 10:
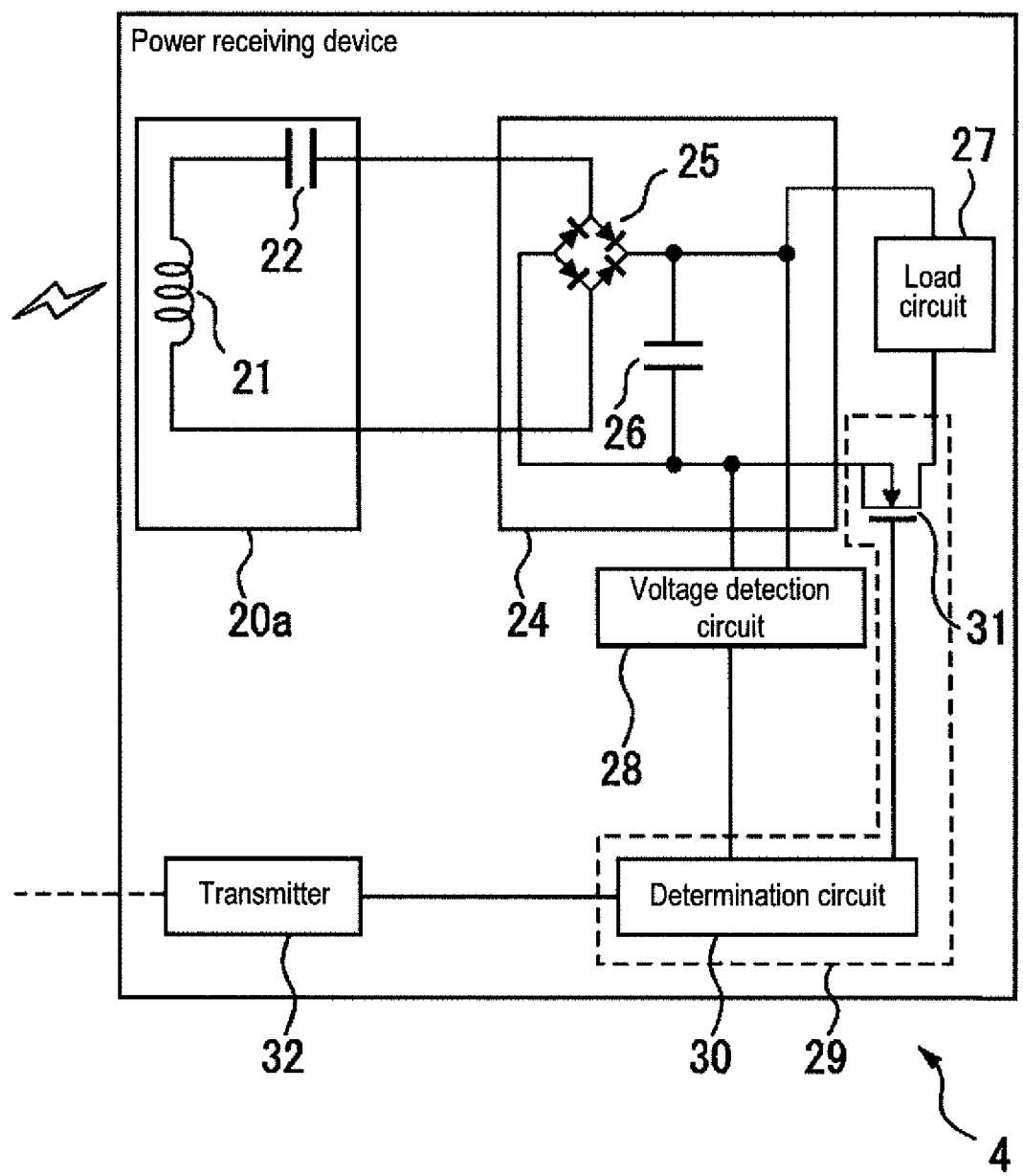
FIG. 10 is a schematic configuration diagram illustrating a power receiving device according to another modification.

FIG. 10 is a schematic configuration diagram illustrating the power receiving device of this modification. A power receiving device 4 of this modification includes a resonance circuit 20a including the receiving coil 21 and the resonance capacitor 22, the rectification smoothing circuit 24, the load circuit 27, the voltage detection circuit 28, the constant voltage determination circuit 29, and the transmitter 32. The power receiving device 4 of this modification is different from the power receiving device 3 of the embodiment in the configuration of the resonance circuit 20a and the omission of the coil 23. The different points and related points will be described below.

In the resonance circuit 20a, the receiving coil 21 and the resonance capacitor 22 are connected in series. The power received through the receiving coil 21 is output to the rectification smoothing circuit 24 through the resonance capacitor 22. As described above, since the non-contact feeding device including the power receiving device 4 has the same configuration as the SS system, the non-contact feeding device can perform the constant voltage output operation. In this example, unlike the SPL system non-contact feeding device, because the resonance circuit 20a resonates in series, the coil 23 may be omitted. Unlike the SS system, the non-contact feeding device including the power receiving device 4 needs not to use the resonance of the transmission coil 14 on the power transmission side. That is, similarly to the embodiment, the control circuit 19 of the power transmission device 2 may control the power supply circuit 10 such that the AC power having the switching frequency at which the transmission coil 14 does not resonate is supplied to the transmission coil 14.

Figure 11:
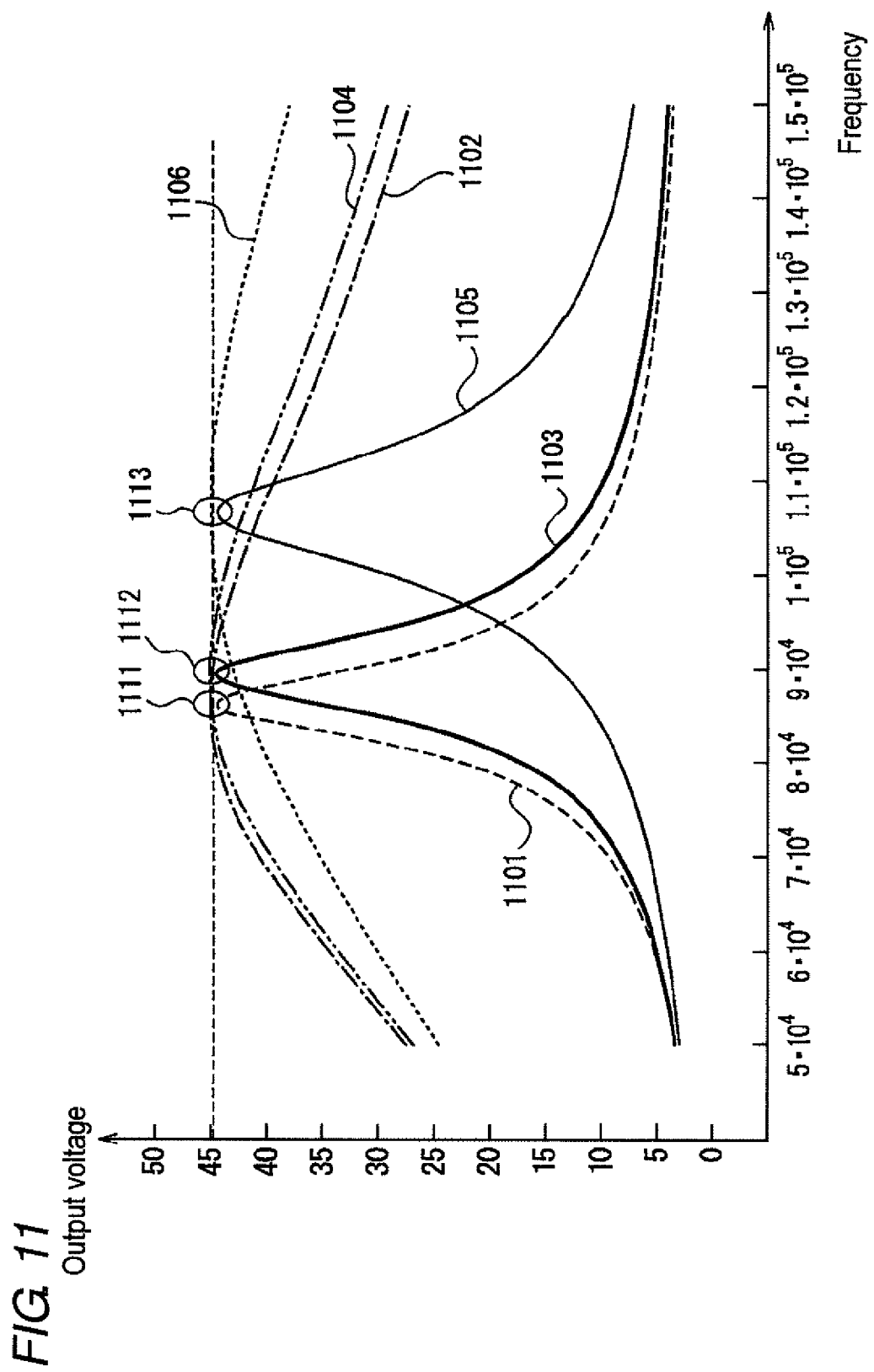
FIG. 11 is a view illustrating an example of the simulation result of the frequency characteristic of the output voltage when voltage applied to the transmission coil is changed according to the degree of coupling in the non-contact feeding device including the power receiving device in FIG. 10 and the power transmission device in FIG. 1.

FIG. 11 is a view illustrating an example of the simulation result of the frequency characteristic of the output voltage when voltage applied to the transmission coil 14 is changed according to the degree of coupling in the non-contact feeding device including the power receiving device 4 of this modification and the power transmission device 2 of the embodiment. In FIG. 11, the horizontal axis represents the frequency and the vertical axis represents the output voltage. This simulation was made under the conditions of $Lp=174$ pH, $Cp=20$ nF, $Ri=Ris=0.1\Omega$, $n=1$, $Vin=300$ V, and $Ro=10\Omega$ ($Rac \approx 8.1\Omega$). A curve 1101 represents the frequency characteristic of the output voltage when the degree of coupling k is set to 0.15, when the AC equivalent resistance value of the load circuit 27 is set to Rac, and when the voltage applied to the transmission coil 14 is set to Vin. A curve 1102 represents the frequency characteristic of the output voltage when the degree of coupling k is set to 0.15, when the AC equivalent resistance value of the load circuit 27 is set to (10*Rac), and when the voltage applied to the transmission coil 14 is set to Vin. A curve 1103 represents the frequency characteristic of the output voltage when the degree of coupling k is set to 0.3, when the AC equivalent resistance value of the load circuit 27 is set to Rac, and when the voltage applied to the transmission coil 14 is set to (0.5*Vin). A curve 1104 represents the frequency characteristic of the output voltage when the degree of coupling k is set to 0.3, when the AC equivalent resistance value of the load circuit 27 is set to (10*Rac), and when the voltage applied to the transmission coil 14 is set to (0.5*Vin). A curve 1105 represents the frequency characteristic of the output voltage when the degree of coupling k is set to 0.6, when the AC equivalent resistance value of the load circuit 27 is set to Rac, and when the voltage applied to the transmission coil 14 is set to (0.25*Vin). A curve 1106 represents the frequency characteristic of the output voltage when the degree of coupling k is set to 0.6, when the AC equivalent resistance value of the load circuit 27 is set to (10*Rac), and when the voltage applied to the transmission coil 14 is set to (0.25*Vin).

As illustrated by points 1111 to 1113 in FIG. 11, in this modification, the combination of the frequency and the output voltage, in which the output voltage is kept substantially constant (that is, the constant voltage output is obtained) even when the AC equivalent resistance value of the load circuit 27 changes under the condition that the degree of coupling k does not change, also exists in each degree of coupling. The output voltages of the points 1111 to 1113 are substantially equal to one another.

As described above, in the non-contact feeding device including the power receiving device 4 and the power transmission device 2, even when either the resistance value or the degree of coupling of the load circuit 27 fluctuates, the output voltage is kept substantially constant by properly adjusting the switching frequency and the voltage of the AC power applied to the transmission coil 14.

In the above embodiment or modification, in the case that the receiver of the power transmission device and the transmitter of the power receiving device can be connected to each other in a wired manner, each of the receiver and the transmitter may include a communication circuit that can transmit and receive a signal including the determination information in the wired manner.

Thus, those skilled in the art can make various modifications within the scope of the present invention according to the embodiment to be implemented.

The invention claimed is:

1. A non-contact feeding device comprising:
   a power transmission device; and
   a power receiving device to which power is transmitted from the power transmission device in a non-contact manner,
   wherein the power transmission device includes:
      a transmission coil configured to supply the power to the power receiving device;
      a power supply circuit configured to supply AC power obtained by boosting or stepping down input voltage to the transmission coil based on a full-bridge operation or a half-bridge operation, and wherein the power supply circuit includes:
         a power factor improvement circuit that includes a switching element and is configured to boost the input voltage in accordance with a duty ratio of the switching element and output DC power;
         a power source configured to supply electric power as the input voltage to the power factor improvement circuit; and
         an inverter configured to convert the DC power output from the power factor improvement circuit into AC power,
      a voltage detection circuit configured to measure the input voltage to the power supply circuit; and
      a control circuit configured to control a degree of boosting or step-down with respect to the input voltage by the power supply circuit according to the input voltage measured,
   wherein the control circuit causes the inverter to perform the full-bridge operation when the input voltage measured is less than a predetermined voltage, and wherein the control circuit causes the inverter to perform the half-bridge operation when the input voltage measured is greater than or equal to the predetermined voltage, and the control circuit includes a memory storing a full-bridge operation reference table representing a relationship between the duty ratio, the input voltage and a frequency of the AC power at which an output voltage from a rectifier circuit of the power receiving device is constant when the inverter performs the full-bridge operation and a half-bridge operation reference table representing a relationship between the duty ratio, the input voltage and the frequency of the AC power at which the output voltage from the rectifier circuit is constant when the inverter performs the half-bridge operation, and the control circuit controls the frequency of the AC power such that the output voltage from the rectifier circuit is constant, selects the duty ratio referring to the full-bridge operation table when the inverter performs the full-bridge operation, and controls the switching element of the power factor improvement circuit in accordance with the selected duty ratio, while the control circuit selects the duty ratio referring to the half-bridge operation table when the inverter performs the half-bridge operation, and controls the switching element of the power factor improvement circuit in accordance with the selected duty ratio, and
   wherein the power receiving device includes:
      a resonance circuit including a receiving coil receiving the power from the power transmission device and a resonance capacitor resonating with the receiving coil according to the power from the power transmission device; and
      the rectifier circuit configured to rectify the power outputted from the resonance circuit.

* * * * *